(12) United States Patent
Xu et al.

(10) Patent No.: US 12,706,091 B2
(45) Date of Patent: Aug. 11, 2026

(54) PRONUNCIATION-AWARE EMBEDDING GENERATION FOR CONVERSATIONAL AI SYSTEMS AND APPLICATIONS

(71) Applicant: NVIDIA CORPORATION, Santa Clara, CA (US)

(72) Inventors: Hainan Xu, New York, NY (US); Boris Ginsburg, Sunnyvale, CA (US); Zhehuai Chen, Odessa, FL (US); Fei Jia, Santa Clara, CA (US)

(73) Assignee: NVIDIA CORPORATION, Santa Clara, CA (US)

( * ) Notice: Subject to any disclaimer, the term of this patent is extended or adjusted under 35 U.S.C. 154(b) by 66 days.

(21) Appl. No.: 18/423,224

(22) Filed: Jan. 25, 2024

(65) Prior Publication Data

US 2025/0078827 A1 Mar. 6, 2025

Related U.S. Application Data

(60) Provisional application No. 63/536,567, filed on Sep. 5, 2023.

(51) Int. Cl.

| | |
|---|---|
| ***G10L 15/187*** | (2013.01) |
| ***G06F 40/284*** | (2020.01) |
| ***G10L 15/02*** | (2006.01) |
| ***G10L 15/16*** | (2006.01) |

(52) U.S. Cl.
CPC .......... *G10L 15/187* (2013.01); *G06F 40/284* (2020.01); *G10L 15/02* (2013.01); *G10L 15/16* (2013.01); *G10L 2015/025* (2013.01)

(58) Field of Classification Search
CPC ....... G10L 15/187; G10L 15/02; G10L 15/16; G10L 2015/025; G06F 40/284
See application file for complete search history.

(56) References Cited

U.S. PATENT DOCUMENTS

2021/0193123 A1* 6/2021 Huang .................... G10L 15/32

OTHER PUBLICATIONS

Povey et al., "The Kaldi Speech Recognition Toolkit", 2011, 4 pages.

(Continued)

*Primary Examiner* — Daniel C Washburn
*Assistant Examiner* — Penny L Caudle
(74) *Attorney, Agent, or Firm* — Squire Patton Boggs LLP; Sarah Mirza

(57) ABSTRACT

One or more embodiments include: receiving a first frame of acoustic input and one or more prior textual tokens associated with a prior frame of the acoustic input, wherein the prior textual token represents one or more spoken word included in the acoustic input; generating a multi-dimensional embedding associated with the prior textual token, wherein each dimension of the embedding represents a different characteristic of the prior textual token, and at least one dimension of the embedding represents pronunciation information associated with the prior textual token; and generating a textual token associated with the first frame based at least on an encoded representation of the first frame and the multi-dimensional embedding associated with the prior textual token.

20 Claims, 8 Drawing Sheets

(56) References Cited

OTHER PUBLICATIONS

Graves et al., "Connectionist Temporal Classification: Labelling Unsegmented Sequence Data with Recurrent Neural Networks", Proceedings of the 23rd International Conference on Machine Learning, 2006, 8 pages.
Graves, Alex, "Sequence Transduction with Recurrent Neural Networks", arXiv:1211.3711, Nov. 14, 2012, 9 pages.
Chorowski et al., "Attention-Based Models for Speech Recognition", arXiv:1506.07503, Jun. 24, 2015, pp. 1-19.
Chan et al., "Listen, Attend and Spell: A Neural Network Forlarge Vocabulary Conversational Speech Recognition", ICASSP, 2016, pp. 4960-4964.
Kuchaiev et al., "NeMo: a toolkit for building AI applications using Neural Modules", arXiv:1909.09577, Sep. 14, 2019, p. 1-8.
Ren et al., "FastSpeech: Fast, Robust and Controllable Text to Speech", 33rd Conference on Neural Information Processing Systems, vol. 32, 2019, pp. 1-10.
Wang et al., "Espresso: A Fast End-To-End Neural Speech Recognition Toolkit", arXiv:1909.08723, Proc. Automatic Speech Recognition and Understanding Workshop, Oct. 15, 2019, pp. 1-8.
Ravanelli et al., "SpeechBrain: A General-Purpose Speech Toolkit", arXiv:2106.04624, Jun. 8, 2021, pp. 1-34.
Shen et al., "Pronunciation-Aware Unique Character Encoding for Rnn Transducer-Based Mandarin Speech Recognition", arXiv:2207.14578, Jul. 29, 2022, 7 pages.
Yuan et al., "Decoupling Recognition and Transcription In Mandarin ASR", arXiv:2108.01129, Aug. 2, 2021, 7 pages.
Xu et al., "Improving End-To-End Speech Recognition with Pronunciation-Assisted Sub-Word Modeling", arXiv:1811.04284, Feb. 21, 2019, 5 pages.
Pandey et al., "Procter: Pronunciation-Aware Contextual Adapter For Personalized Speech Recognition In Neural Transducers", arXiv:2303.17131, Mar. 30, 2023, 5 pages.
Chang et al., "Context-Aware Transformer Transducer For Speech Recognition", arXiv:2111.03250, Nov. 5, 2021, 8 pages.
Chen et al., "Joint Grapheme and Phoneme Embeddings for Contextual End-to-End ASR", Interspeech, http://dx.doi.org/10.21437/Interspeech.2019-1434, Sep. 15-19, 2019, pp. 3490-3494.
Bruguier et al., "Phoebe: Pronunciation-Aware Contextualization for End-To-End Speech Recognition", ICASSP, 2019, pp. 6171-6175.
Pundak et al., "Deep Context: End-To-End Contextual Speech Recognition", arXiv:1808.02480, Aug. 7, 2018, 8 pages.
Du et al., "AISHELL-2: Transforming Mandarin ASR Research Into Industrial Scale", arXiv:1808.10583, Sep. 13, 2018, 3 pages.
Rekesh et al., "Fast Conformer with Linearly Scalable Attention For Efficient Speech Recognition", arXiv:2305.05084, Sep. 30, 2023, 8 pages.
Wang et al., "THCHS-30 : A Free Chinese Speech Corpus", arXiv:1512.01882, Dec. 10, 2015, 6 pages.
Schmidt, Florian, "Generalization in Generation: A closer look at Exposure Bias", arXiv:1910.00292, Nov. 7, 2019, 12 pages.
Xu et al., "Transducers with Pronunciation-Aware Embeddings for Automatic Speech Recognition", 2024, 5 pages.

* cited by examiner

PRONUNCIATION-AWARE EMBEDDING GENERATION FOR CONVERSATIONAL AI SYSTEMS AND APPLICATIONS

CROSS-REFERENCE TO RELATED APPLICATIONS

This application claims the benefit of U.S. Provisional Application No. 63/536,567, filed on Sep. 5, 2023, which is hereby incorporated by reference in its entirety.

TECHNICAL FIELD

The embodiments of this disclosure pertain to language processing and, more specifically, to improving automatic speech recognition through pronunciation-aware embedding techniques.

BACKGROUND

Automatic Speech Recognition (ASR) technology serves as the computational process that converts human speech into a machine-readable text format, facilitating interaction across a spectrum of digital platforms. ASR systems have undergone significant evolution to cater to a diverse array of industry needs. In the realm of consumer electronics, ASR enables voice-activated commands for smartphones, tablets, and smart home devices, allowing for hands-free operation and accessibility enhancements. In professional sectors, ASR provides accurate transcription services vital for documentation in legal proceedings and medical consultations, where precise language capture is paramount. The technology extends to support customer service operations through voice-operated bots that can understand and respond in multiple languages, increasing efficiency and customer engagement. Furthermore, ASR applications in educational tools assist in language learning and aid students with disabilities by transcribing lectures in real-time. In the automotive industry, ASR contributes to driver safety through voice-controlled navigation and infotainment systems. As a critical component of artificial intelligence ecosystems, ASR technologies continue to advance, incorporating complex algorithms to improve accuracy, reduce latency, and understand natural language with greater context sensitivity.

Languages rich in homophones, such as Mandarin Chinese, pose substantial challenges for ASR methods due to the requirement to distinguish between words that have similar sounds but carry different meanings. In Mandarin, for instance, the difference in meaning between "mā" (mother) and "ma" (horse) hinges on subtle tonal variations that are not always easily detected by ASR systems. Other examples include "shī" (poet) and "shí" (ten), or "li" (plum) and "lǐ" (strength), where the distinction comes down to minute variations in tone and pronunciation.

Conventional ASR systems handle the challenges in interpreting languages rich in homophones through a combination of acoustic modeling, context analysis, and language modeling. Acoustic models are trained on large datasets to recognize the distinct phonetic components and tonal patterns of each word. The acoustic models often use machine learning algorithms to differentiate between the slight tonal inflections that separate homophones. Context analysis involves examining the words in the surrounding spoken phrase to predict the most likely meaning based on the syntactic and semantic rules of the language. Language models, which predict word sequences based on their likelihood of occurrence, aid in this contextual understanding by using statistical probabilities informed by extensive corpuses of the target language.

Despite the aforementioned approaches, conventional ASR systems still face notable challenges, especially in casual or rapid speech where tones are not enunciated clearly. A prominent drawback is that the conventional ASR systems often treat homophones as separate lexical units, ignoring the phonetic similarities. Treating homophones as separate lexical units leads to frequent errors in interpretation and transcription, especially when the spoken language lacks clear contextual indicators.

Another drawback is that the conventional ASR systems involve breaking down speech into individual text tokens for analysis and subsequent generation of textual output. However, the conventional ASR systems often overlook detailed acoustic features of speech, such as intonation and pronunciation changes. Elements such as the subtle rise and fall of intonation or the precise articulation of pronunciation often elude detection. In particular, conventional ASR systems demonstrate a notable deficiency in incorporating these acoustic subtleties, which becomes especially apparent in the context of tonal languages like Vietnamese, where pitch determines meaning, or pitch-accented languages like Japanese, where the pitch can alter the interpretation of a word. Such limitations markedly impede the ability of conventional ASR systems to accurately process homophones, which are prevalent in linguistically intricate settings, leading to a significant accuracy gap in speech recognition.

As the foregoing illustrates, what is needed in the art are more effective techniques for embedding text tokens for speech recognition.

DETAILED DESCRIPTION

In the following description, numerous specific details are set forth to provide a more thorough understanding of the various embodiments. However, it will be apparent to one of skilled in the art that the inventive concepts may be practiced without one or more of these specific details.

System Overview

Figure 1:
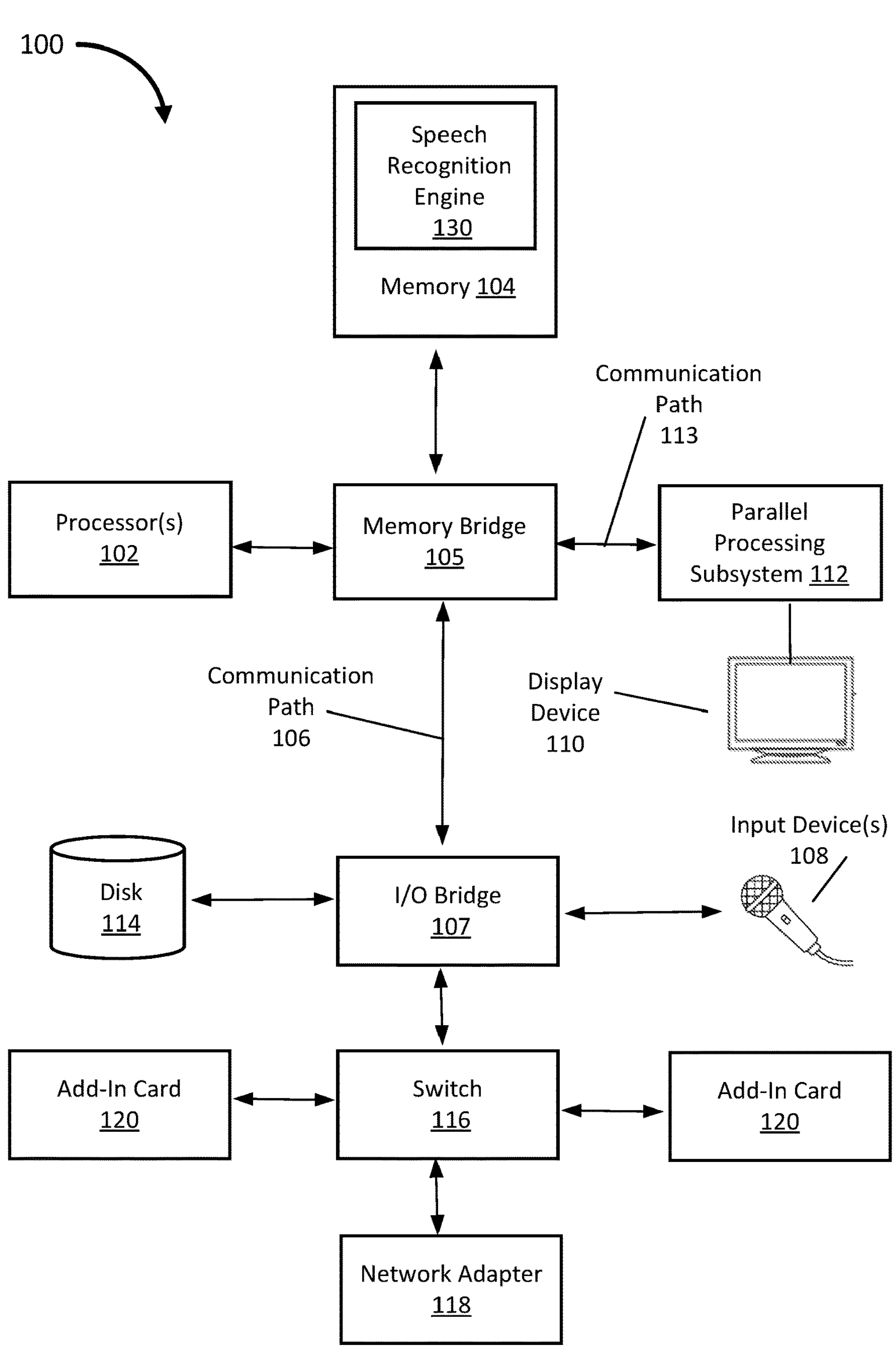
FIG. 1 illustrates a block diagram of a computing system configured to implement one or more aspects of at least one embodiment.

FIG. 1 is a block diagram illustrating a computing system 100 configured to implement one or more aspects of at least one embodiment. In at least one embodiment, the computing system 100 may include any type of computing device, including, without limitation, a server machine, a server platform, a desktop machine, a laptop machine, a hand-held/mobile device, a digital kiosk, an in-vehicle infotainment system, and/or a wearable device. In at least one embodiment, the computing system 100 is a server machine operating in a data center or a cloud computing environment that provides scalable computing resources as a service over a network.

In various embodiments, the computing system 100 includes, without limitation, processor(s) 102 and memory(ies) 104 coupled to a parallel processing subsystem 112 via a memory bridge 105 and a communication path 113. Memory bridge 105 is further coupled to an I/O (input/output) bridge 107 via a communication path 106, and I/O bridge 107 is, in turn, coupled to a switch 116.

In one embodiment, I/O bridge 107 is configured to receive user audio input through various input devices 108, such as microphones, integrated voice input systems, digital voice recorders, direct audio file uploads and/or the like. The audio input is then forwarded to processor(s) 102 for processing. In embodiments where the computing system 100 operates as a server within a cloud computing environment, physical input devices may be absent. Instead, computing system 100 is adept at receiving audio input data over a network, facilitated by network adapter 118, in the form of commands or files from a remote computing device. I/O bridge 107 orchestrates the transfer of this data to the speech recognition engine. Additionally, switch 116 ensures the seamless connection between I/O bridge 107 and other vital components of the system, such as network adapter 118 and any associated add-in cards 120 and 121, which together contribute to the robust processing and accurate transcription of the spoken words into text within the ASR system.

In at least one embodiment, I/O bridge 107 is coupled to a system disk 114 that may be configured to store content and applications and data for use by processor(s) 102 and parallel processing subsystem 112. In one embodiment, system disk 114 provides non-volatile storage for applications and data and may include fixed or removable hard disk drives, flash memory devices, and CD-ROM (compact disc read-only-memory), DVD-ROM (digital versatile disc-ROM), Blu-ray, HD-DVD (high-definition DVD), or other magnetic, optical, or solid-state storage devices. In various embodiments, other components, such as universal serial bus or other port connections, compact disc drives, digital versatile disc drives, film recording devices, and the like, may be connected to I/O bridge 107 as well.

In various embodiments, memory bridge 105 may be a Northbridge chip, and I/O bridge 107 may be a Southbridge chip. In addition, communication paths 106 and 113, as well as other communication paths within computing system 100, may be implemented using any technically suitable protocols, including, without limitation, AGP (Accelerated Graphics Port), HyperTransport, or any other bus or point-to-point communication protocol known in the art.

In at least one embodiment, parallel processing subsystem 112 comprises a graphics subsystem that delivers pixels to an optional display device 110 that may be any conventional cathode ray tube, liquid crystal display, light-emitting diode display, and/or the like. In such embodiments, the parallel processing subsystem 112 may incorporate circuitry optimized for graphics and video processing, including, for example, video output circuitry. Such circuitry may be incorporated across one or more parallel processing units (PPUs), also referred to herein as parallel processors, included within the parallel processing subsystem 112.

In at least one embodiment, the parallel processing subsystem 112 incorporates circuitry optimized (e.g., that undergoes optimization) for general purpose and/or compute processing. Again, such circuitry may be incorporated across one or more PPUs included within parallel processing subsystem 112 that are configured to perform such general purpose and/or compute operations. In yet other embodiments, the one or more PPUs included within parallel processing subsystem 112 may be configured to perform graphics processing, general purpose processing, and/or compute processing operations. The memor(ies) 104 include at least one device driver configured to manage the processing operations of the one or more PPUs within parallel processing subsystem 112. In addition, the memor(ies) 104 include a speech recognition engine 130. The speech recognition engine 130 can be included in any technically feasible application in at least one embodiment. The speech recognition engine 130 is described in greater detail herein in conjunction with at least FIG. 2.

Figure 2:
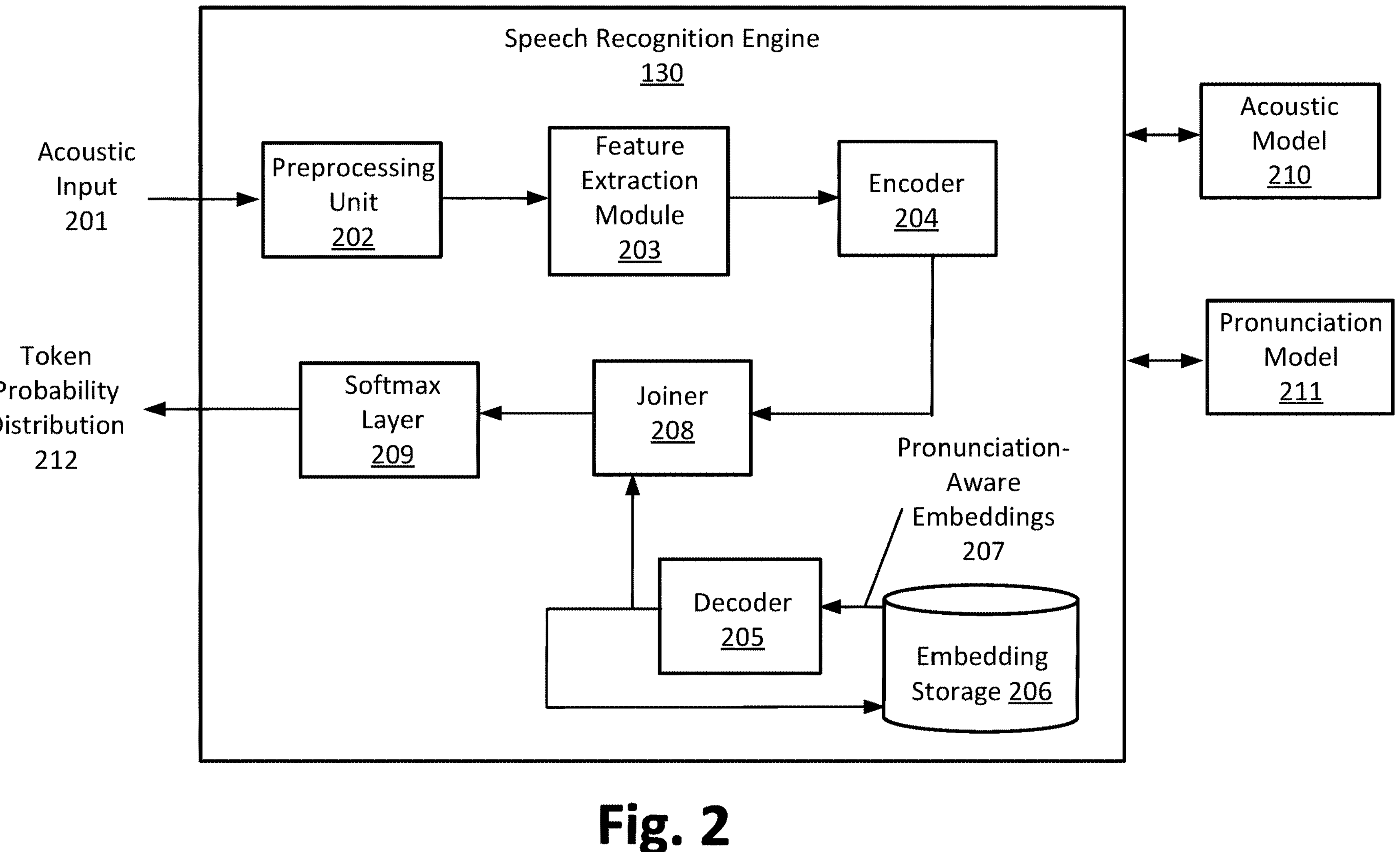
FIG. 2 is a more detailed illustration of the speech recognition engine of FIG. 1, according to at least one embodiment.

In various embodiments, parallel processing subsystem 112 may be integrated with one or more of the other elements of FIG. 2 to form a single system. For example, parallel processing subsystem 112 may be integrated with processor(s) 102 and other connection circuitry on a single chip to form a system on a chip (SoC).

In at least one embodiment, the processor(s) 102 includes a primary processor of the computing system 100, controlling and coordinating operations of other system components. In at least one embodiment, the processor(s) 102 issues commands that control the operation of PPUs. In at least one embodiment, communication path 113 is a PCI Express link, in which dedicated lanes are allocated to each PPU. Other communication paths may also be used. The PPU advantageously implements a highly parallel processing architecture, and the PPU may be provided with any amount of local parallel processing memory (PP memory).

It will be appreciated that the system shown herein is illustrative and that variations and modifications are possible. The connection topology, including the number and arrangement of bridges, the number of processors 102, and the number of parallel processing subsystems 112, may be modified as desired. For example, in at least one embodiment, the memor(ies) 104 may be connected to the processor(s) 102 directly rather than through memory bridge 105, and other devices may communicate with memor(ies) 104 via memory bridge 105 and processor 102. In other embodiments, parallel processing subsystem 112 may be connected to I/O bridge 107 or directly to processor(s) 102, rather than to memory bridge 105. In still other embodiments, I/O bridge 107 and memory bridge 105 may be integrated into a single chip instead of existing as one or more discrete devices. In certain embodiments, one or more components shown in FIG. 2 may not be present. For example, switch 116 may be eliminated, and network adapter 118 and add-in cards 120, 121 would connect directly to I/O bridge 107. Lastly, in certain embodiments, one or more components shown in FIG. 2 may be implemented as virtualized resources in a virtual computing environment, such as a cloud computing environment. In particular, the parallel processing subsystem 112 may be implemented as a virtualized parallel processing subsystem in at least one embodiment. For example, the parallel processing subsystem 112 may be implemented as a virtual graphics processing unit(s) (vGPU(s)) that renders graphics on a virtual machine(s) (VM(s)) executing on a server machine(s) whose GPU(s) and other physical resources are shared across one or more VMs.

Pronunciation-Aware Embeddings for Speech Recognition

FIG. 2 presents a detailed illustration of the speech recognition engine 130, in accordance with at least one embodiment. The speech recognition engine 130 includes a preprocessing unit 202, a feature extraction module 203, an encoder 204, a decoder 205, an embedding storage 206, which stores pronunciation-aware embeddings 207, a joiner 208, and a softmax layer 209. The speech recognition engine 130 also interacts with, or otherwise accesses, an acoustic model 210 and a pronunciation model 211.

In operation, the speech recognition engine 130 transforms spoken language captured via an acoustic input into corresponding text. The speech recognition engine 130 receives acoustic input 201, which is processed by the preprocessing unit 202. After the initial preprocessing, the feature extraction module 203 analyses the audio to extract acoustic features of the audio. The extracted features are encoded into a higher-level abstract representation by the encoder 204. The encoded audio features are then input to the joiner 208, which also receives input from the decoder 205. The decoder 205 retrieves pronunciation-aware embeddings 207 from the embedding storage 206, which are indexed by one or more text tokens that are previously predicted. The embeddings in embedding storage 206 enhance the predictions of the decoder by incorporating pronunciation information into the analysis. The joiner 208 combines the predictions from the decoder 205 with the output of the encoder 204 to generate a set of possible next text tokens representing the acoustic input. The set of possible next tokens is processed by the softmax layer 209 to produce a token probability distribution 212 over the token vocabulary. The token probability distribution 212 represents the likelihoods of potential next tokens in the sequence. In various embodiments, the token probability distribution 212 can undergo further post-processing to refine the predicted token sequence into coherent and contextually accurate text. The following discussion outlines the detailed operation of each of the components in the speech recognition engine 130.

In operation, the preprocessing unit 202 conditions the acoustic input 201. For example, without limitation, the preprocessing unit 202 applies one or more signal processing algorithms that filter out noise and normalize the acoustic input 201. In some embodiments, preprocessing unit 202 performs functions, such as echo cancellation, dynamic range compression, and/or the like, to reduce fluctuations in volume. For example, in an environment with background traffic noise, the preprocessing unit 202 reduces interference, allowing the speech to be more discernible.

In some embodiments, the preprocessing unit 202 performs band-pass filtering to focus the frequency range of the audio input to a frequency that is common in human speech. This frequency is typically between 300 Hz to 3400 Hz, which is the range where most phonetic information resides. Equalization adjustments can also be made to address any frequency response imbalances stemming from the recording equipment or the environment. In various embodiments, the preprocessing unit 202 transmits an audio signal to the feature extraction module 203 that has reduced or no extraneous noise and is of a uniform, or substantially uniform, volume, providing a stable foundation for accurate feature extraction.

In various embodiments, the feature extraction module 203 analyzes the preprocessed audio data to extract a set of acoustic features. The set of acoustic features include spectral properties of the audio data, such as Mel-frequency cepstral coefficients (MFCCs), which are representations of the short-term power spectrum of sound and capture the phonetic characteristics of speech. The set of acoustic features also include temporal dynamics associated with the audio data, such as zero-crossing rates and energy contours. The temporal dynamics assist in distinguishing between voiced and unvoiced sounds, which facilitates the understanding of speech rhythm and cadence. Additionally, the set of features include pitch, formant frequencies, and/or other features that provide information about the tone and articulation of spoken words. For example, temporal features facilitate distinguishing between the plosive sounds /p/ and /b/. Furthermore, in some embodiments, the feature extraction module 203 isolates features that indicate the presence of specific phonemes.

The encoder 204 transforms the extracted acoustic features generated by the feature extraction module 203 into an encoded representation that is suitable for downstream processing. In one embodiment, the encoder 204 comprises a series of artificial neural network layers, such as recurrent neural networks (RNNs), convolutional neural networks (CNNs), and/or the like, or other machine learning algorithms to process the complex patterns found in speech. The machine learning algorithms detect and encode a wide range of speech characteristics, from the short-term variations indicative of phonemes to the long-term modulations that convey intonation and rhythm, such as the subtle inflections that differentiate a question from a statement. For example, the encoder 204 determines the acoustic features that distinguish between the sounds of 's' and 'sh,' despite the acoustic similarity. The encoder 204 also distinguishes between stressed and unstressed syllables, which can change the meaning of words in certain languages. The encoder 204 transmits the encoded representation to the joiner 208.

In some embodiments, the acoustic model 210 provides to the encoder 204 databases of phonetic sounds and audio patterns that distinguish different speech sounds. The encoder 204 encodes the acoustic features based on the phonetic sounds and audio patterns provided by the acoustic model 210. For example, the acoustic input 201 can contain a vast array of spoken vowels and consonants across multiple languages. The acoustic model 210 enables the encoder 204 to identify specific sounds, such as the difference between the hard 'c' in 'cat' and the soft 'c' in 'cent.' In some embodiments, the acoustic model 210 provides the encoder 204 with temporal features that capture the rhythm and pace of speech, aiding in the recognition of stress patterns and intonation.

The embedding storage 206 stores arrays of pronunciation-aware embeddings 207 that reflect the context in which words are used. In various embodiments, a pronunciation-aware embedding 207 for a given spoken word includes a multi-dimensional representation of phonetic features associated with the word. For example, the pronunciation-aware embeddings 207 encode features including, but not limited to, (i) word identity (e.g. the specific character or word being spoken, such as "他" for "ta" reflecting the identity of the word in a given language), (ii) Romanized pronunciation (e.g. the representation of the spoken word in a Romanized form, such as the Romanized pronunciation "ta" for the word "他"), (iii) tone for tonal languages, where the tone can alter the meaning of the word (e.g. the tone for "ta" when expressed as "他" (he/him) in Mandarin Chinese would be indicated with a number, such as "1" for a high-level tone), and (iv) beginning consonant(s), which can refer to the initial consonant sounds in the Romanized pronunciation, for example, for "ta," would be "t", suffix of pronunciation referring to the remaining part of the pronunciation after the initial consonant is removed, for example, for "ta" is "a." For a given word, the features within the associated pronunciation-aware embedding 207 reflects the correct pronunciation of the word in its contextual usage. The embedding storage 206 interfaces with the decoder 205, enabling the decoder 205 to access relevant, pronunciation-aware embeddings 207.

In various embodiments, the decoder 205 uses pronunciation-aware embeddings 207 from the embedding storage 206 to predict one or more candidate text tokens. The decoder 205 accesses the pronunciation-aware embeddings 207 corresponding to previously predicted tokens from the embedding storage 206. By analyzing the sequence of the pronunciation-aware embeddings 207 that reflect previously recognized speech, the decoder 205 determines the likelihood of subsequent tokens to generate predictions about the ongoing sequence of speech. For example, the decoder 205 can encounter a segment such as "r-e-a-d," which is phonetically ambiguous without context. The pronunciation-aware embeddings 207 provide the context, distinguishing between "read" [ri:d] as in "They will read the book" with a long 'e' sound, and "read" [rɛd] as in "I read the book yesterday," with a short 'e' sound. The decoder 205 makes such a distinction by referencing the tone, stress, and preceding phonetic environment encoded within the pronunciation-aware embeddings 207.

In various embodiments, the decoder 205 is a neural network that processes pronunciation-aware embeddings 207, which include detailed phonetic nuances and other features of speech, to predict the candidate text tokens. In some embodiments, the decoder 205 comprises a Recurrent Neural Network (RNN), including Long Short-Term Memory (LSTM) units and/or Gated Recurrent Units (GRUs), to process the temporal aspects of spoken language. In some embodiments, the decoder 205 also comprises an attention mechanism to focus on features of the pronunciation-aware embeddings 207 that are most relevant to the current prediction task. In some embodiments, beam search algorithms work in concert with the artificial neural network to navigate through candidate text tokens, retaining only the most likely candidate sequences at each operation.

In some embodiments, in addition to the pronunciation-aware embeddings 207, the decoder 205 uses the pronunciation model 211 when predicting the candidate text token. The pronunciation model 211 includes a lexicon of phonetic transcriptions representing various pronunciations of words, accommodating standard and/or regional dialects. For example, the pronunciation model 211 stores different pronunciations of the word 'data' to account for regional variations. The decoder 205 uses the lexicon in the pronunciation model 211 to recognize and process variations in speech accurately. In addition to the lexicon, the pronunciation model 211 can include rules related to syllable structure, stress placement, and intonation patterns. In various embodiments, the decoder 205 uses these rules to determine syllable boundaries, identify where stress is placed in words, and determine the intonation across sentences.

The joiner 208 integrates the encoded acoustic features from the encoder 204 with the candidate text tokens generated by the decoder 205 to generate a token distribution. In some embodiments, the joiner 208 can include a neural network or a similar computational model. In various embodiments, a neural network within the joiner 208 is trained to merge encoded acoustic features with candidate text tokens generated by the decoder 205. The neural network determines the congruency between the acoustic features and the corresponding linguistic elements, such that the predicted text sequence aligns with both the phonetic and semantic aspects of the acoustic input 201. For instance, the joiner 208 can evaluate the compatibility of a specific acoustic pattern corresponding to a phonetic sound associated with a candidate text token. In various embodiments, the softmax layer 209 transforms the output from the joiner 208—the token distribution—into a probability distribution over the entire token vocabulary. The softmax layer 209 uses the softmax function for converting raw scores, often known as logits, from the joiner 208 into probabilities. By doing so, the softmax layer 209 assigns a probabilistic value to each token in a token vocabulary, indicating how likely each one is to be the correct next token in the sequence of spoken language, and outputs the token probability distribution 212. For example, if the output of the joiner 208 suggests a few potential next text tokens in a sentence, such as "drive," "driven," or "driver," the softmax layer 209 assigns a probability to each of the tokens. The probabilities are then calculated summing up to one, allowing for a coherent distribution. The word with the highest probability is then selected as the most likely candidate. The process is akin to predicting the next word in a sentence like "She went for a . . . " where the options could be "walk," "run," or "drive." The softmax layer 209, in this case, evaluates the contextual suitability of each word and assigns the highest probability to "drive," assuming the context supports this choice.

Pronunciation-Aware Embedding Generation

Figure 3:
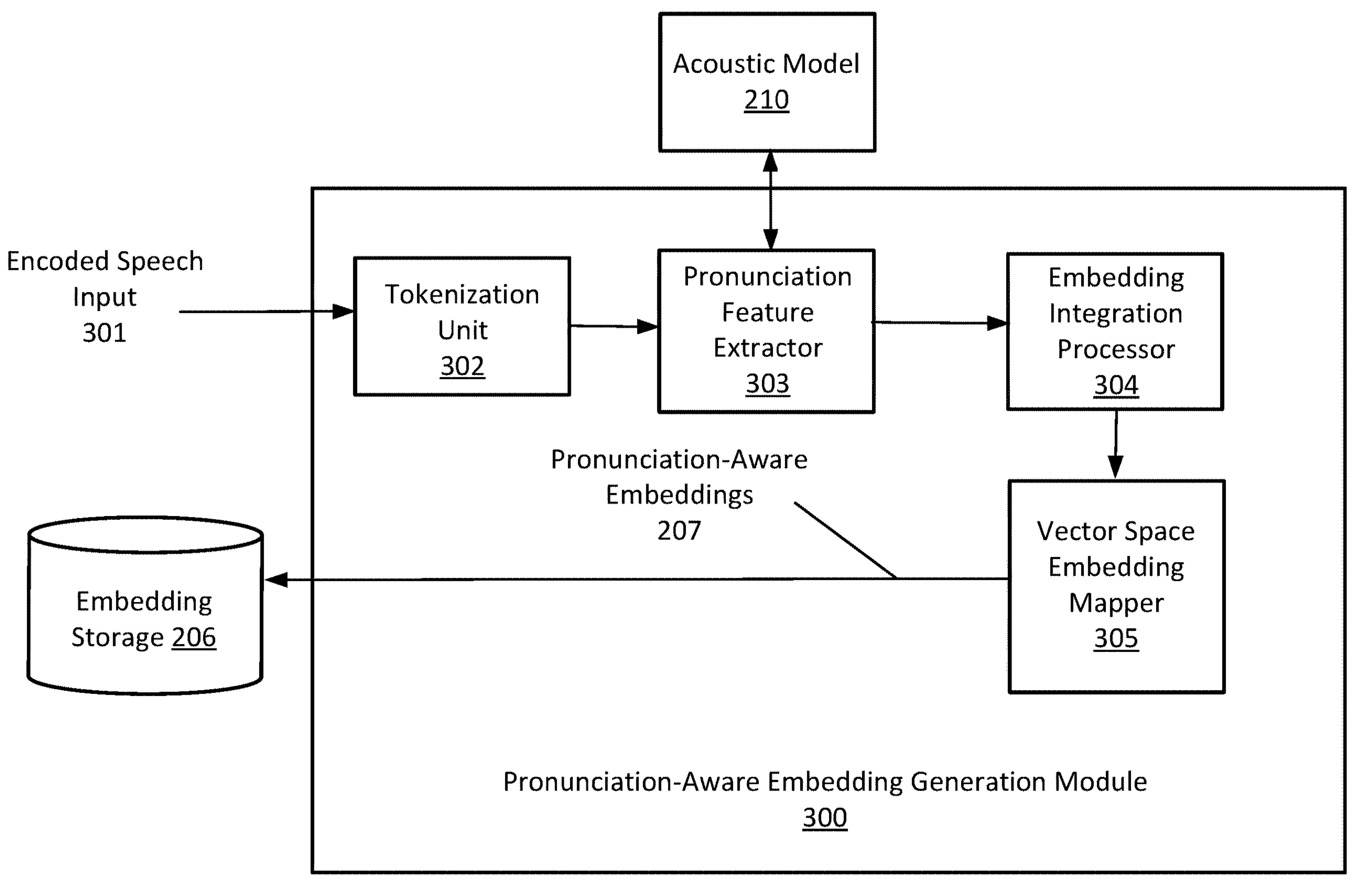
FIG. 3 is a more detailed illustration of the offline training system to generate the embedding storage as used by the speech recognition engine of FIG. 2, according to at least one embodiment.

FIG. 3 illustrates the pronunciation-aware embedding generation module 300, in accordance with at least one embodiment. In various embodiments, the pronunciation-aware embedding generation module 300 generates the pronunciation-aware embeddings 207 stored in the embedding storage 206. The pronunciation-aware embedding generation module 300 includes a tokenization unit 302, a pronunciation feature extractor 303, an embedding integration processor 304, and a vector space embedding mapper 305.

The tokenization unit 302 segments encoded acoustic input 301 into tokens suitable for pronunciation analysis. The pronunciation feature extractor 303, which, in some embodiments, interacts with the acoustic model 210, receives the tokens from the tokenization unit 302 and extracts phonetic features from the tokens. The embedding integration processor 304 processes the phonetic features to generate initial embeddings that include both phonetic and contextual information. In various embodiments, the vector space embedding mapper 305 projects the initial embeddings into a multidimensional vector space, optimizing the initial embeddings for pattern recognition and retrieval. Finally, the embedding storage 206 archives the completed pronunciation-aware embeddings 207. The following discussion describes the operation of each of the components in the pronunciation-aware embedding generation module 300 in more detail.

In operation, the tokenization unit 302 divides the stream of encoded acoustic input 301 into discrete segments, referred to herein as tokens. In various embodiments, to do so, the tokenization unit 302 parses the encoded acoustic input 310 to identify boundaries between distinct linguistic units. Distinct linguistic units can be as small as individual phonemes—the smallest sound units like /p/, /b/, /t/, /d/—or as large as whole words within a sentence. For languages that do not use delimiters, such as spaces, the tokenization unit 302 analyzes the boundaries based on phonetic and linguistic cues. For example, in the input phrase "streamlining processes," the tokenization unit 302 would segment the phrase into "stream-lin-ing pro-cess-es" based on the syllables. As another example, the tokenization unit 302 would identify "streamlining" and "processes" as separate tokens based on those being separate words. In some embodiments, the tokenization unit 302 normalizes the generated tokens to a given format, such as converting all the tokens into lowercase letters.

In various embodiments, the tokenization unit 302 generates tokens from the encoded acoustic input 301 using a set of linguistic rules. The linguistic rules specify one or more parameters that define aspects of spoken languages, such as spaces and punctuation and phonetic segmentation. In some embodiments, the tokenization unit 302 comprises a machine learning model, trained on language corpora, that predicts token boundaries based on the encoded acoustic input 301. In some embodiments, the tokenization unit 302 implements a combination of the set of linguistic rules and the machine learning model to generate the tokens, enhancing both the accuracy and the efficiency of the tokenization process.

The pronunciation feature extractor 303 receives tokens from the tokenization unit 302 and extracts one or more phonetic features from each of the tokens. For each token, the phonetic features include, but are not limited to, the specific sounds that make up each token, articulatory properties, tonal qualities, and the length of time each sound is held. In some embodiments, the pronunciation feature extractor 303 also extracts prosodic features that span across multiple phonemes, including, but not limited to, stress and intonation patterns and the rhythm of speech sequences.

In various embodiments, the pronunciation feature extractor 303 uses the acoustic model 210, which has been trained on large corpora of spoken language, to identify the likely phonetic features of each token. In some embodiments, the pronunciation feature extractor 303 uses rule-based algorithms that apply linguistic knowledge to deduce phonetic features, such as identifying stress patterns based on the syllable structure of words in known linguistic contexts and/or the like. In one embodiment, the pronunciation feature extractor 303 includes a hybrid algorithm, which uses rule-based analysis to generate hypotheses about phonetic features that are then refined using the acoustic model 210 trained on acoustic examples.

The embedding integration processor 304 transforms, for each token, the phonetic features received from the pronunciation feature extractor 303 into structured numerical representations, known as embeddings. The embedding integration processor 304 maps the multi-dimensional phonetic data included in the phonetic features onto a numerical vector space. In various embodiments, each dimension of the numerical vector space represents a different phonetic attribute, creating a numerical profile for each token. For example, for the Mandarin word "他" (pronounced "ta"), the embedding integration processor 304 generates a vector, where each dimension of the vector corresponds to a different phonetic attribute: the first dimension encodes the word identity, numerically representing "他" as 1002; the second dimension handles the Romanized pronunciation "ta," encoded as 2005; the third dimension captures the tonal aspect of Mandarin, with the high-level tone of "ta" encoded as 1000; the fourth dimension represents the initial consonant sound "t," given a value of 1500; and the fifth dimension encodes the suffix of the pronunciation, "a," as 2800. This results in a vector [1002, 2005, 1000, 1500, 2800] for "他," encapsulating the linguistic identity, pronunciation, and tonal characteristics of the Mandarin word "他".

In various embodiments, the embedding integration processor 304 includes the weighted feature combination algorithm, where different phonetic aspects like pitch, duration, and intensity are assigned varying degrees of importance in the final embedding. In some embodiments the embedding integration processor 304 uses feature concatenation, where multiple phonetic attributes, such as vowel length, consonant sharpness, and stress, are combined end-to-end in a single embedding vector. In some embodiments, the embedding integration processor 304 employs machine learning techniques to refine the integration of phonetic features, including but not limited to neural networks, which can learn complex patterns of speech features, such as the nuances of intonation in questions versus statements, or the subtle differences in pronunciation of dialectical variations, decision trees or random forest algorithms, which can make rule-based decisions about how to combine features, for example, determining when to give precedence to tonal quality over articulatory details based on the linguistic context.

In various embodiments, the vector space embedding mapper 305 receives the multi-dimensional embeddings, which include the phonetic and contextual characteristics of speech tokens, from the embedding integration processor 304 and projects the embeddings into a multidimensional vector space. The projection is designed to spatially organize the embeddings in a way that reflects the phonetic and linguistic similarities and differences between tokens. For example, consider two phonetically similar Mandarin words "他" (ta) and "大" (dà), both having distinct meanings but sharing some phonetic characteristics. The embedding integration processor 304 outputs the embeddings as [1002, 2005, 1000, 1500, 2800] for "他" and [1003, 2006, 4000, 1500, 2900] for "大". The vector space embedding mapper 305 receives the embeddings [1002, 2005, 1000, 1500, 2800] for "他" and [1003, 2006, 4000, 1500, 2900] for "大" and projects them into a vector space in such a way that reflects the phonetic similarities and differences between "他" and "大". In the vector space, the embeddings for "他" and "大" would be positioned relatively close to each other due to the shared consonant and similar structure, despite differences in tone and other phonetic attributes.

In various embodiments, the vector space embedding mapper 305 includes dimensionality reduction techniques, such as autoencoder, Uniform Manifold Approximation and Projection (UMAP), t-Distributed Stochastic Neighbor Embedding (t-SNE), Principal Component Analysis (PCA), and/or the like, to make the vector space more manageable while retaining the essential properties of the embeddings. In some embodiments, the vector space embedding mapper 305 uses optimization algorithms, such as Linear Discriminant Analysis (LDA), K-Means Clustering, Multi-Dimensional Scaling (MDS), to arrange the embeddings in the vector space so that the spatial distribution reflects the phonetic and linguistic relationships between the tokens.

After the training phase, the pronunciation-aware embeddings 207 are stored in the embedding storage 206 to be used by the decoder 205.

Figure 4:
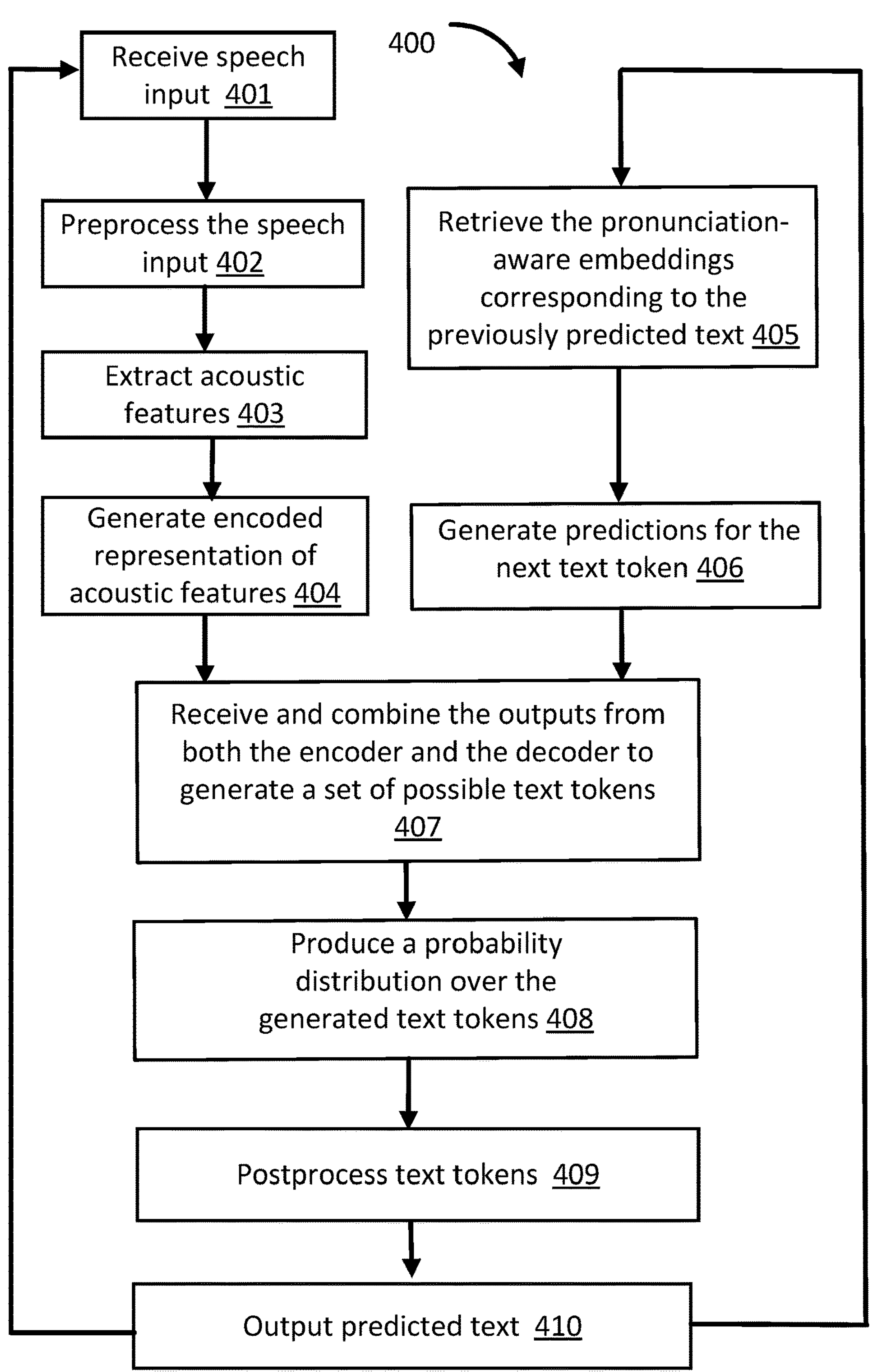
FIG. 4 illustrates a flow diagram of a process for a speech recognition engine to respond to user audio input, according to at least one embodiment.

FIG. 4 is a flow diagram of method operations for embedding text tokens for speech recognition within a computing system 100 according to various embodiments of the present disclosure. Although the method operations are described in conjunction with the systems of FIGS. 1-3, persons skilled in the art will understand that any system configured to perform the method operations, in any order, falls within the scope of the present disclosure.

The method 400 begins at operation 401, where the speech recognition engine 130 receives a frame of acoustic input, which consists of spoken language, via input device(s) 108. In various embodiments, the speech recognition engine 130 can receive the acoustic input in any technically feasible manner, such as via a UI provided by the speech recognition engine 130 or from another application that transmits the user input, including direct voice input, recordings, and/or the like, to the speech recognition engine 130.

At operation 402, the speech recognition engine 130 preprocesses the frame of acoustic input into a signal suitable for feature extraction. In at least one embodiment, preprocessing unit 202 includes bandpass filters and noise reduction algorithms to tune the frequency range of the acoustic input to center around the spectrum typical of human speech and filter out background sounds, such as traffic noise, ambient chatter, electronic interference, and/or the like. In some embodiments, preprocessing unit 202 includes equalization algorithms to address any frequency response imbalances caused by the recording equipment or the environment.

At operation 403, the speech recognition engine 130 extracts a set of acoustic features from the preprocessed acoustic input. In some embodiments, the feature extraction module 203 uses Mel-Frequency Cepstral Coefficients (MFCCs) to extract the acoustic feature representing the timbre of the speech by converting the preprocessed acoustic input into a representation of the power spectrum. In at least one embodiment, the feature extraction module 203 extracts phonemes, which are the smallest units of sound in speech, from the preprocessed acoustic input. For example, the feature extraction module 203 extracts the constituent phonemes /s/, /p/, /i:/, and /tf/ of the word "speech".

At operation 404, the speech recognition engine 130 encodes the acoustic features into an encoded representation. In various embodiments, the encoder 204 includes various signal processing and machine learning algorithms to encode the acoustic features into a structured format conducive for speech recognition. In at least one embodiment, the encoder 204 uses Deep Neural Networks (DNNs), which can consist of multiple layers of interconnected nodes or neurons to learn hierarchies of acoustic features. For example, when processing the phoneme sequence /kæt/for the word "cat," a DNN can first recognize individual phonemes, then the combination in a syllable, and finally the word as a whole—each layer of the DNN capturing more abstract aspects of the input features. In some embodiments, the encoder 204 uses Convolutional Neural Networks (CNNs) to encode local patterns within the feature set. For example, a CNN can identify the textural patterns of fricative sounds like /s/ or /sh/ by examining the localized frequency distributions over time. In various embodiments, the encoder 204 uses the acoustic model 210, which includes databases of phonetic sounds and audio patterns, to encode the acoustic features.

At operation 405, the speech recognition engine 130 retrieves the pronunciation-aware embeddings 207 corresponding to text tokens predicted for one or more previous frames of the acoustic input from the embedding storage 206. The pronunciation-aware embeddings 207 are generated by the pronunciation-aware embedding generation module 300 and stored in the embedding storage 206. In various embodiments, the decoder 205 uses phonetic features within the pronunciation-aware embedding 207 for previously predicted text, including but not limited to word identity, Romanized pronunciation, tone in tonal languages, and distinct consonant and vowel sounds, to infer context from the pronunciation-aware embeddings 207.

At operation 406, the decoder 205 generates predictions for the next text token based on the pronunciation-aware embeddings 207 retrieved in operation 405. In various embodiments, the decoder 205 considers various factors encoded within the pronunciation-aware embeddings 207, such as the phonetic details of previous words, the tonal characteristics in tonal languages, stress patterns, the syntactic structure implied by the sequence of tokens so far, and/or the like, and predict the next possible text tokens. In various embodiments, the decoder 205 uses algorithms, such as beam search and attention mechanisms, to consider multiple hypotheses at once, narrowing down to the most probable text tokens and to enable the decoder 205 to focus on specific parts of the pronunciation-aware embeddings 207 that are most relevant for predicting the next text tokens, respectively.

At operation 407, the speech recognition engine 130 combines the outputs from both the encoder 204 and the decoder 205 to generate a distribution of possible text tokens. In various embodiments, the joiner 208 uses a neural network or any similar computational model, trained to merge the encoded acoustic features from the encoder 204 and the text tokens generated by the decoder 205, to predict a set of possible text tokens.

At operation 408, the speech recognition engine 130 produces a probability distribution over the generated text tokens at operation 407. The softmax layer 209 applies the softmax function to create a probability distribution across the generated text tokens and each text token is assigned a probability that reflects the likelihood of being the correct. For example, the softmax layer 209 handles the output from the joiner 208, which has combined encoded speech features from the encoder 204 with contextual information from the decoder 205 for a sentence fragment like "After the long day, she really needed to . . . ". The joiner 208 proposes potential text tokens such as "rest," "eat," or "leave," based on the speaker's tone and the sentence context. The softmax layer 209 then assigns probabilities to these tokens, turning the hypotheses of the joiner 208 into a measurable probability distribution over the entire generated text tokens (e.g. a probability of 0.6 to "rest," indicating a high likelihood given the speaker's tired tone, while "eat" and "leave" can receive lower probabilities, such as 0.3 and 0.1, respectively).

At operation 409, the speech recognition engine 130 processes the text tokens. The text token that has been assigned the highest probability by the softmax layer 209 is selected as the most likely candidate to be the correct continuation or completion of the spoken sentence in the acoustic input. In various embodiments, the selected text token is analyzed and refined to ensure the final output is not only accurate in terms of content but also grammatically and contextually coherent. For example, if the selected text token form a sentence fragment like "She walk to the store," the system corrects "walk" to "walked" or "walks" depending on the context. The predicted text is then provided to the decoder 205 to be used at operation 405.

At operation 410, the speech recognition engine 130 outputs the selected text token, for example through the display device 110 of the computing system 100. The display device 110, which can be a monitor, a screen on a handheld device, or any other visual interface integrated with the computing system 100, visually presents the predicted text, allowing users to see, review, and interact with the output of the speech recognition engine 130. For example, in a scenario where a user dictates an email, the display device 110 can show the transcribed text of the acoustic input, enabling the user to read through and confirm its accuracy.

After completing operation 410, the method loops back to operation 401 to analyze additional user acoustic inputs by repeating method 400. By repeating method 400, the computing system 100 uses pronunciation-aware embeddings for speech recognition.

In sum, the disclosed technique, referred to as the Pronunciation-Aware Embedding Technique (PET), embeds pronunciation details into text token embeddings for speech recognition. In various embodiments, each spoken word is broken into text tokens positioned within a vector space that captures multiple dimensions. The embedding mechanism not only includes recognizing the identity of each token but also phonetic attributes associated with the token. More particularly, the vector representation of each token includes a range of pronunciation data, e.g., complete phonetic transcriptions to specific syllables, sounds and/or the like. In some embodiments, PET is used within the framework of a transducer model of ASR, which consists of an encoder and a decoder among other components. The encoder processes the acoustic input, and the decoder operates on the detailed embeddings to determine the textual output that best matches the spoken input. A feedback mechanism in the transducer model, which utilizes the output of the decoder to refine subsequent predictions, benefits from the detailed embeddings provided by PET. After the encoder and decoder process the acoustic input, the system outputs a textual representation that more closely matches the spoken input.

Example Computing Device

Figure 5:
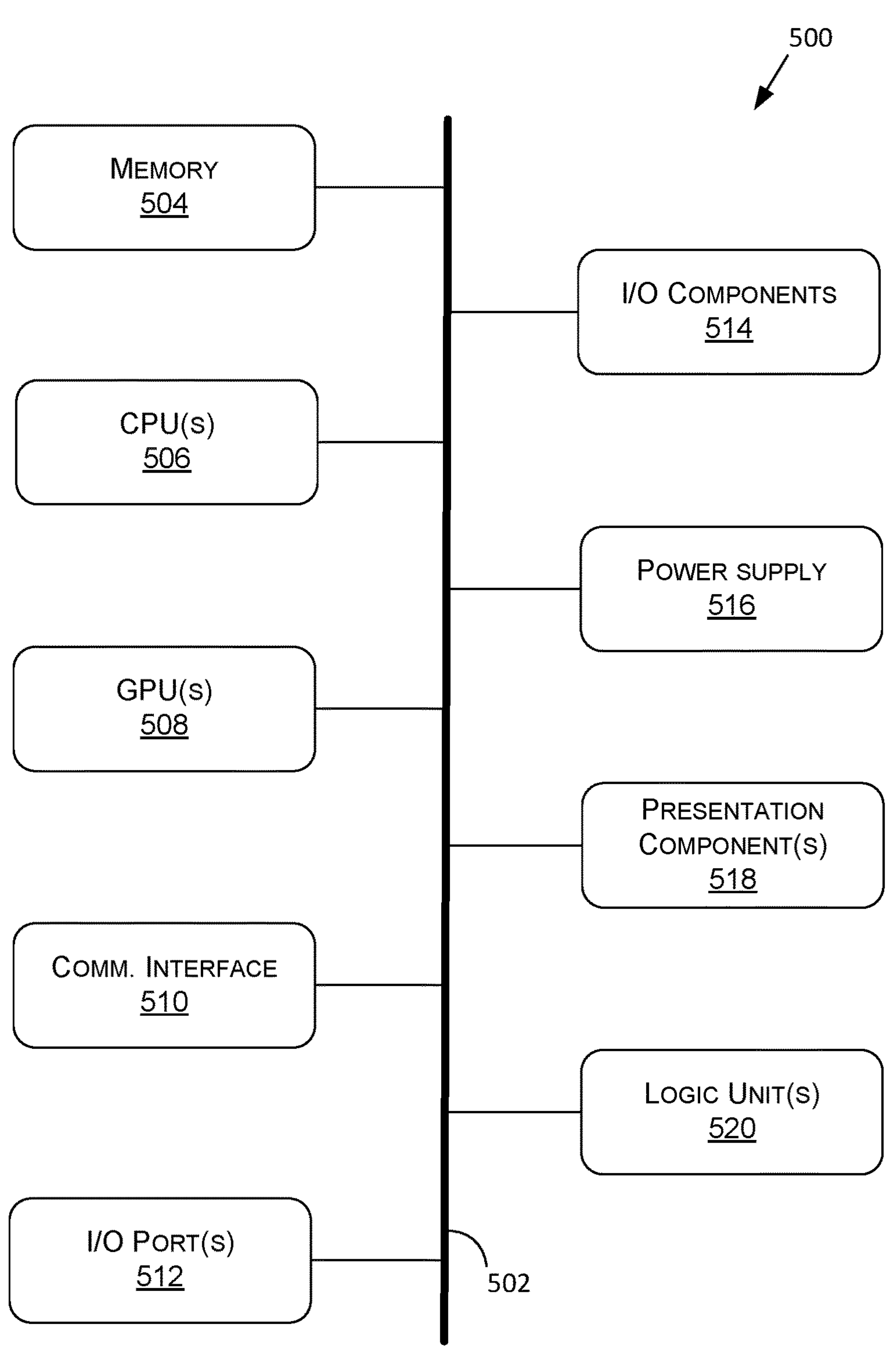
FIG. 5 is a block diagram of an example computing device(s) 500 suitable for use in implementing some embodiments of the present disclosure.

FIG. 5 is a block diagram of an example computing device(s) 500 suitable for use in implementing some embodiments of the present disclosure. Computing device 500 may include an interconnect system 502 that directly or indirectly couples the following devices: memory 504, one or more central processing units (CPUs) 506, one or more graphics processing units (GPUs) 508, a communication interface 510, input/output (I/O) ports 512, input/output components 514, a power supply 516, one or more presentation components 518 (e.g., display(s)), and one or more logic units 520. In at least one embodiment, the computing device(s) 500 may comprise one or more virtual machines (VMs), and/or any of the components thereof may comprise virtual components (e.g., virtual hardware components). For non-limiting examples, one or more of the GPUs 508 may comprise one or more vGPUs, one or more of the CPUs 506 may comprise one or more vCPUs, and/or one or more of the logic units 520 may comprise one or more virtual logic units. As such, a computing device(s) 500 may include discrete components (e.g., a full GPU dedicated to the computing device 500), virtual components (e.g., a portion of a GPU dedicated to the computing device 500), or a combination thereof.

Although the various blocks of FIG. 5 are shown as connected via the interconnect system 502 with lines, this is not intended to be limiting and is for clarity only. For example, in some embodiments, a presentation component 518, such as a display device, may be considered an I/O component 514 (e.g., if the display is a touch screen). As another example, the CPUs 506 and/or GPUs 508 may include memory (e.g., the memory 504 may be representative of a storage device in addition to the memory of the GPUs 508, the CPUs 506, and/or other components). In other words, the computing device of FIG. 5 is merely illustrative. Distinction is not made between such categories as "workstation," "server," "laptop," "desktop," "tablet," "client device," "mobile device," "hand-held device," "game console," "electronic control unit (ECU)," "virtual reality system," and/or other device or system types, as all are contemplated within the scope of the computing device of FIG. 5.

The interconnect system 502 may represent one or more links or busses, such as an address bus, a data bus, a control bus, or a combination thereof. The interconnect system 502 may include one or more bus or link types, such as an industry standard architecture (ISA) bus, an extended industry standard architecture (EISA) bus, a video electronics standards association (VESA) bus, a peripheral component interconnect (PCI) bus, a peripheral component interconnect express (PCIe) bus, and/or another type of bus or link. In some embodiments, there are direct connections between components. As an example, the CPU 506 may be directly connected to the memory 504. Further, the CPU 506 may be directly connected to the GPU 508. Where there is direct, or point-to-point connection between components, the interconnect system 502 may include a PCIe link to carry out the connection. In these examples, a PCI bus need not be included in the computing device 500.

The memory 504 may include any of a variety of computer-readable media. The computer-readable media may be any available media that may be accessed by the computing device 500. The computer-readable media may include both volatile and nonvolatile media, and removable and non-removable media. By way of example, and not limitation, the computer-readable media may comprise computer-storage media and communication media.

The computer-storage media may include both volatile and nonvolatile media and/or removable and non-removable media implemented in any method or technology for storage of information such as computer-readable instructions, data structures, program modules, and/or other data types. For example, the memory 504 may store computer-readable instructions (e.g., that represent a program(s) and/or a program element(s), such as an operating system. Computer-storage media may include, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which may be used to store the desired information and which may be accessed by computing device 500. As used herein, computer storage media does not comprise signals per se.

The computer storage media may embody computer-readable instructions, data structures, program modules, and/or other data types in a modulated data signal such as a carrier wave or other transport mechanism and includes any information delivery media. The term "modulated data signal" may refer to a signal that has one or more of its characteristics set or changed in such a manner as to encode information in the signal. By way of example, and not limitation, the computer storage media may include wired media such as a wired network or direct-wired connection, and wireless media such as acoustic, RF, infrared and other wireless media. Combinations of any of the above should also be included within the scope of computer-readable media.

The CPU(s) 506 may be configured to execute at least some of the computer-readable instructions to control one or more components of the computing device 500 to perform one or more of the methods and/or processes described herein. The CPU(s) 506 may each include one or more cores (e.g., one, two, four, eight, twenty-eight, seventy-two, etc.) that are capable of handling a multitude of software threads simultaneously. The CPU(s) 506 may include any type of processor, and may include different types of processors depending on the type of computing device 500 implemented (e.g., processors with fewer cores for mobile devices and processors with more cores for servers). For example, depending on the type of computing device 500, the processor may be an Advanced RISC Machines (ARM) processor implemented using Reduced Instruction Set Computing (RISC) or an x86 processor implemented using Complex Instruction Set Computing (CISC). The computing device 500 may include one or more CPUs 506 in addition to one or more microprocessors or supplementary co-processors, such as math co-processors.

In addition to or alternatively from the CPU(s) 506, the GPU(s) 508 may be configured to execute at least some of the computer-readable instructions to control one or more components of the computing device 500 to perform one or more of the methods and/or processes described herein. One or more of the GPU(s) 508 may be an integrated GPU (e.g., with one or more of the CPU(s) 506 and/or one or more of the GPU(s) 508 may be a discrete GPU. In embodiments, one or more of the GPU(s) 508 may be a coprocessor of one or more of the CPU(s) 506. The GPU(s) 508 may be used by the computing device 500 to render graphics (e.g., 3D graphics) or perform general purpose computations. For example, the GPU(s) 508 may be used for General-Purpose computing on GPUs (GPGPU). The GPU(s) 508 may include hundreds or thousands of cores that are capable of handling hundreds or thousands of software threads simultaneously. The GPU(s) 508 may generate pixel data for output images in response to rendering commands (e.g., rendering commands from the CPU(s) 506 received via a host interface). The GPU(s) 508 may include graphics memory, such as display memory, for storing pixel data or any other suitable data, such as GPGPU data. The display memory may be included as part of the memory 504. The GPU(s) 508 may include two or more GPUs operating in parallel (e.g., via a link). The link may directly connect the GPUs (e.g., using NVLINK) or may connect the GPUs through a switch (e.g., using NVSwitch). When combined together, each GPU 508 may generate pixel data or GPGPU data for different portions of an output or for different outputs (e.g., a first GPU for a first image and a second GPU for a second image). Each GPU may include its own memory, or may share memory with other GPUs.

In addition to or alternatively from the CPU(s) 506 and/or the GPU(s) 508, the logic unit(s) 520 may be configured to execute at least some of the computer-readable instructions to control one or more components of the computing device 500 to perform one or more of the methods and/or processes described herein. In embodiments, the CPU(s) 506, the GPU(s) 508, and/or the logic unit(s) 520 may discretely or jointly perform any combination of the methods, processes and/or portions thereof. One or more of the logic units 520 may be part of and/or integrated in one or more of the CPU(s) 506 and/or the GPU(s) 508 and/or one or more of the logic units 520 may be discrete components or otherwise external to the CPU(s) 506 and/or the GPU(s) 508. In embodiments, one or more of the logic units 520 may be a coprocessor of one or more of the CPU(s) 506 and/or one or more of the GPU(s) 508.

Examples of the logic unit(s) 520 include one or more processing cores and/or components thereof, such as Data Processing Units (DPUs), Tensor Cores (TCs), Tensor Processing Units (TPUs), Pixel Visual Cores (PVCs), Vision Processing Units (VPUs), Graphics Processing Clusters (GPCs), Texture Processing Clusters (TPCs), Streaming Multiprocessors (SMs), Tree Traversal Units (TTUs), Artificial Intelligence Accelerators (AIAs), Deep Learning Accelerators (DLAs), Arithmetic-Logic Units (ALUs), Application-Specific Integrated Circuits (ASICs), Floating Point Units (FPUs), input/output (I/O) elements, peripheral component interconnect (PCI) or peripheral component interconnect express (PCIe) elements, and/or the like.

In various embodiments, one or more CPU(s) 506, GPU(s) 508, and/or logic unit(s) 520 are configured to execute one or more instances of recommendation engine 122 and/or language model 124. Recommendations 260 can then be generated based on user question 224 and provided to user, e.g., via text interface 220 of language model 124.

The communication interface 510 may include one or more receivers, transmitters, and/or transceivers that enable the computing device 500 to communicate with other computing devices via an electronic communication network, included wired and/or wireless communications. The communication interface 510 may include components and functionality to enable communication over any of a number of different networks, such as wireless networks (e.g., Wi-Fi, Z-Wave, Bluetooth, Bluetooth LE, ZigBee, etc.), wired networks (e.g., communicating over Ethernet or InfiniBand), low-power wide-area networks (e.g., LoRaWAN, SigFox, etc.), and/or the Internet. In one or more embodiments, logic unit(s) 520 and/or communication interface 510 may include one or more data processing units (DPUs) to transmit data received over a network and/or through interconnect system 502 directly to (e.g., a memory of) one or more GPU(s) 508.

The I/O ports 512 may enable the computing device 500 to be logically coupled to other devices including the I/O components 514, the presentation component(s) 518, and/or other components, some of which may be built in to (e.g., integrated in) the computing device 500. Illustrative I/O components 514 include a microphone, mouse, keyboard, joystick, game pad, game controller, satellite dish, scanner, printer, wireless device, etc. The I/O components 514 may provide a natural user interface (NUI) that processes air gestures, voice, or other physiological inputs generated by a user. In some instances, inputs may be transmitted to an appropriate network element for further processing. An NUI may implement any combination of speech recognition, stylus recognition, facial recognition, biometric recognition, gesture recognition both on screen and adjacent to the screen, air gestures, head and eye tracking, and touch recognition (as described in more detail below) associated with a display of the computing device 500. The computing device 500 may include depth cameras, such as stereoscopic camera systems, infrared camera systems, RGB camera systems, touchscreen technology, and combinations of these, for gesture detection and recognition. Additionally, the computing device 500 may include accelerometers or gyroscopes (e.g., as part of an inertia measurement unit (IMU)) that enable detection of motion. In some examples, the output of the accelerometers or gyroscopes may be used by the computing device 500 to render immersive augmented reality or virtual reality.

The power supply 516 may include a hard-wired power supply, a battery power supply, or a combination thereof. The power supply 516 may provide power to the computing device 500 to enable the components of the computing device 500 to operate.

The presentation component(s) 518 may include a display (e.g., a monitor, a touch screen, a television screen, a heads-up-display (HUD), other display types, or a combination thereof), speakers, and/or other presentation components. The presentation component(s) 518 may receive data from other components (e.g., the GPU(s) 508, the CPU(s) 506, DPUs, etc.), and output the data (e.g., as an image, video, sound, etc.).

Example Data Center

Figure 6:
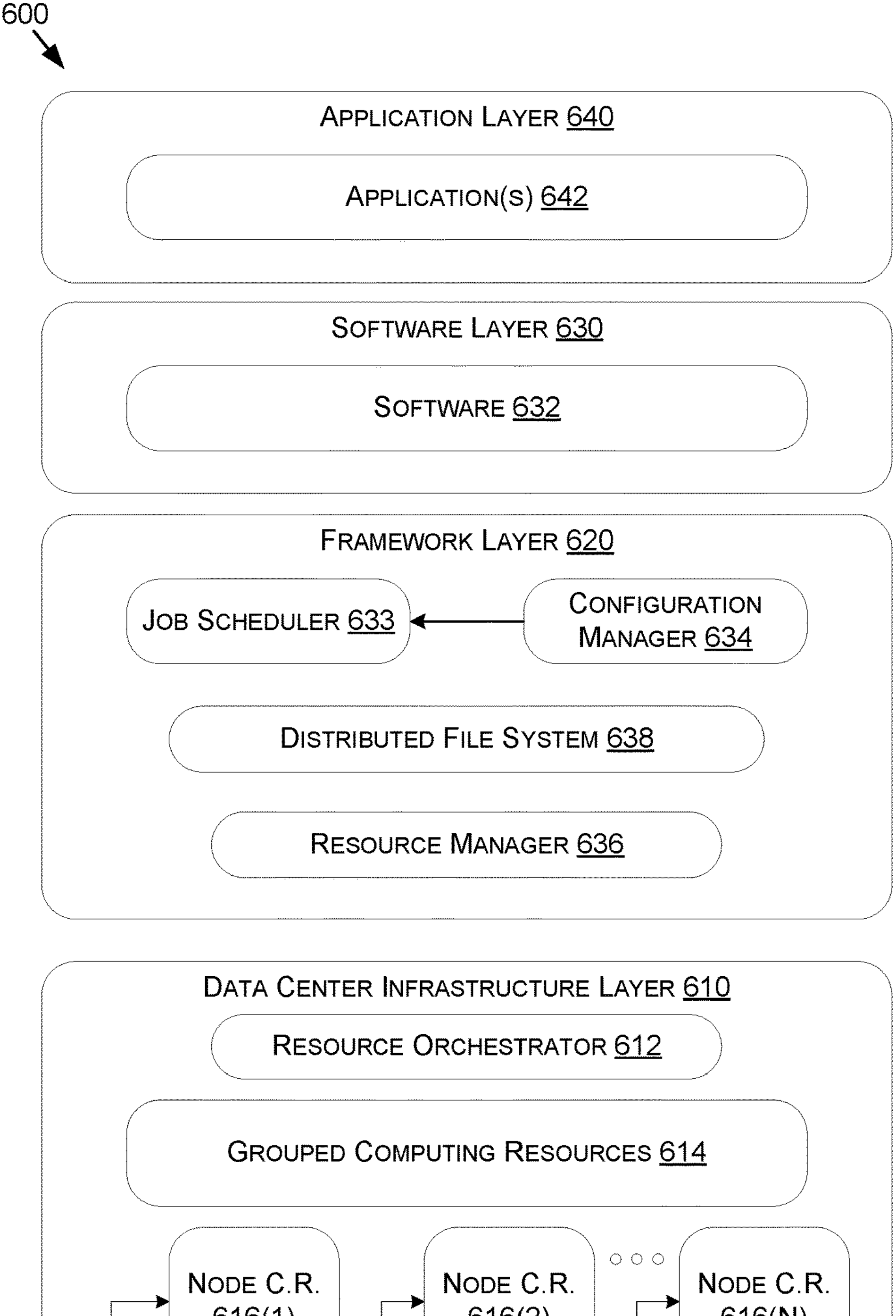
FIG. 6 illustrates an example data center 600 that may be used in at least one embodiments of the present disclosure.

FIG. 6 illustrates an example data center 600 that may be used in at least one embodiments of the present disclosure. The data center 600 may include a data center infrastructure layer 610, a framework layer 620, a software layer 630, and/or an application layer 640.

As shown in FIG. 6, the data center infrastructure layer 610 may include a resource orchestrator 612, grouped computing resources 614, and node computing resources ("node C.R.s") 616(1)-716(N), where "N" represents any whole, positive integer. In at least one embodiment, node C.R.s 616(1)-716(N) may include, but are not limited to, any number of central processing units (CPUs) or other processors (including DPUs, accelerators, field programmable gate arrays (FPGAs), graphics processors or graphics processing units (GPUs), etc.), memory devices (e.g., dynamic read-only memory), storage devices (e.g., solid state or disk drives), network input/output (NW I/O) devices, network switches, virtual machines (VMs), power modules, and/or cooling modules, etc. In some embodiments, one or more node C.R.s from among node C.R.s 616(1)-716(N) may correspond to a server having one or more of the above-mentioned computing resources. In addition, in some embodiments, the node C.R.s 616(1)-716(N) may include one or more virtual components, such as vGPUs, vCPUs, and/or the like, and/or one or more of the node C.R.s 616(1)-716(N) may correspond to a virtual machine (VM).

In at least one embodiment, grouped computing resources 614 may include separate groupings of node C.R.s 616 housed within one or more racks (not shown), or many racks housed in data centers at various geographical locations (also not shown). Separate groupings of node C.R.s 616 within grouped computing resources 614 may include grouped compute, network, memory or storage resources that may be configured or allocated to support one or more workloads. In at least one embodiment, several node C.R.s 616 including CPUs, GPUs, DPUs, and/or other processors may be grouped within one or more racks to provide compute resources to support one or more workloads. The one or more racks may also include any number of power modules, cooling modules, and/or network switches, in any combination.

The resource orchestrator 612 may configure or otherwise control one or more node C.R.s 616(1)-716(N) and/or grouped computing resources 614. In at least one embodiment, resource orchestrator 612 may include a software design infrastructure (SDI) management entity for the data center 600. The resource orchestrator 612 may include hardware, software, or some combination thereof.

In at least one embodiment, as shown in FIG. 6, framework layer 620 may include a job scheduler 633, a configuration manager 634, a resource manager 636, and/or a distributed file system 638. The framework layer 620 may include a framework to support software 632 of software layer 630 and/or one or more application(s) 642 of application layer 640. The software 632 or application(s) 642 may respectively include web-based service software or applications, such as those provided by Amazon Web Services, Google Cloud and Microsoft Azure. The framework layer 620 may be, but is not limited to, a type of free and open-source software web application framework such as Apache Spark™ (hereinafter "Spark") that may utilize distributed file system 638 for large-scale data processing (e.g., "big dat"). In at least one embodiment, job scheduler 633 may include a Spark driver to facilitate scheduling of workloads supported by various layers of data center 600. The configuration manager 634 may be capable of configuring different layers such as software layer 630 and framework layer 620 including Spark and distributed file system 638 for supporting large-scale data processing. The resource manager 636 may be capable of managing clustered or grouped computing resources mapped to or allocated for support of distributed file system 638 and job scheduler 633. In at least one embodiment, clustered or grouped computing resources may include grouped computing resource 614 at data center infrastructure layer 610. The resource manager 636 may coordinate with resource orchestrator 612 to manage these mapped or allocated computing resources.

In at least one embodiment, software 632 included in software layer 630 may include software used by at least portions of node C.R.s 616(1)-716(N), grouped computing resources 614, and/or distributed file system 638 of framework layer 620. One or more types of software may include, but are not limited to, Internet web page search software, e-mail virus scan software, database software, and streaming video content software.

In at least one embodiment, application(s) 642 included in application layer 640 may include one or more types of applications used by at least portions of node C.R.s 616(1)-716(N), grouped computing resources 614, and/or distributed file system 638 of framework layer 620. One or more types of applications may include, but are not limited to, any number of a genomics application, a cognitive compute, and a machine learning application, including training or inferencing software, machine learning framework software (e.g., PyTorch, TensorFlow, Caffe, etc.), and/or other machine learning applications used in conjunction with one or more embodiments.

In at least one embodiment, any of configuration manager 634, resource manager 636, and resource orchestrator 612 may implement any number and type of self-modifying actions based on any amount and type of data acquired in any technically feasible fashion. Self-modifying actions may relieve a data center operator of data center 600 from making possibly bad configuration decisions and possibly avoiding underutilized and/or poor performing portions of a data center.

The data center 600 may include tools, services, software or other resources to train one or more machine learning models or predict or infer information using one or more machine learning models according to one or more embodiments described herein. For example, a machine learning model(s) may be trained by calculating weight parameters according to a neural network architecture using software and/or computing resources described above with respect to the data center 600. In at least one embodiment, trained or deployed machine learning models corresponding to one or more neural networks may be used to infer or predict information using resources described above with respect to the data center 600 by using weight parameters calculated through one or more training techniques, such as but not limited to those described herein.

In at least one embodiment, the data center 600 may use CPUs, application-specific integrated circuits (ASICs), GPUs, FPGAs, and/or other hardware (or virtual compute resources corresponding thereto) to perform training and/or inferencing using above-described resources. Moreover, one or more software and/or hardware resources described above may be configured as a service to allow users to train or performing inferencing of information, such as image recognition, speech recognition, or other artificial intelligence services.

Example Network Environments

Network environments suitable for use in implementing embodiments of the disclosure may include one or more client devices, servers, network attached storage (NAS), other backend devices, and/or other device types. The client devices, servers, and/or other device types (e.g., each device) may be implemented on one or more instances of the computing device(s) 500 of FIG. 5—e.g., each device may include similar components, features, and/or functionality of the computing device(s) 500. In addition, where backend devices (e.g., servers, NAS, etc.) are implemented, the backend devices may be included as part of a data center 600, an example of which is described in more detail herein with respect to FIG. 6.

Components of a network environment may communicate with each other via a network(s), which may be wired, wireless, or both. The network may include multiple networks, or a network of networks. By way of example, the network may include one or more Wide Area Networks (WANs), one or more Local Area Networks (LANs), one or more public networks such as the Internet and/or a public switched telephone network (PSTN), and/or one or more private networks. Where the network includes a wireless telecommunications network, components such as a base station, a communications tower, or even access points (as well as other components) may provide wireless connectivity.

Compatible network environments may include one or more peer-to-peer network environments—in which case a server may not be included in a network environment—and one or more client-server network environments—in which case one or more servers may be included in a network environment. In peer-to-peer network environments, functionality described herein with respect to a server(s) may be implemented on any number of client devices.

In at least one embodiment, a network environment may include one or more cloud-based network environments, a distributed computing environment, a combination thereof, etc. A cloud-based network environment may include a framework layer, a job scheduler, a resource manager, and a distributed file system implemented on one or more of servers, which may include one or more core network servers and/or edge servers. A framework layer may include a framework to support software of a software layer and/or one or more application(s) of an application layer. The software or application(s) may respectively include web-based service software or applications. In embodiments, one or more of the client devices may use the web-based service software or applications (e.g., by accessing the service software and/or applications via one or more application programming interfaces (APIs)). The framework layer may be, but is not limited to, a type of free and open-source software web application framework such as that may use a distributed file system for large-scale data processing (e.g., "big dat").

A cloud-based network environment may provide cloud computing and/or cloud storage that carries out any combination of computing and/or data storage functions described herein (or one or more portions thereof). Any of these various functions may be distributed over multiple locations from central or core servers (e.g., of one or more data centers that may be distributed across a state, a region, a country, the globe, etc.). If a connection to a user (e.g., a client device) is relatively close to an edge server(s), a core server(s) may designate at least a portion of the functionality to the edge server(s). A cloud-based network environment may be private (e.g., limited to a single organization), may be public (e.g., available to many organizations), and/or a combination thereof (e.g., a hybrid cloud environment).

The client device(s) may include at least some of the components, features, and functionality of the example computing device(s) 500 described herein with respect to FIG. 5. By way of example and not limitation, a client device may be embodied as a Personal Computer (PC), a laptop computer, a mobile device, a smartphone, a tablet computer, a smart watch, a wearable computer, a Personal Digital Assistant (PDA), an MP3 player, a virtual reality headset, a Global Positioning System (GPS) or device, a video player, a video camera, a surveillance device or system, a vehicle, a boat, a flying vessel, a virtual machine, a drone, a robot, a handheld communications device, a hospital device, a gaming device or system, an entertainment system, a vehicle computer system, an embedded system controller, a remote control, an appliance, a consumer electronic device, a workstation, an edge device, any combination of these delineated devices, or any other suitable device.

Inference and Training Logic

Figure 7A:
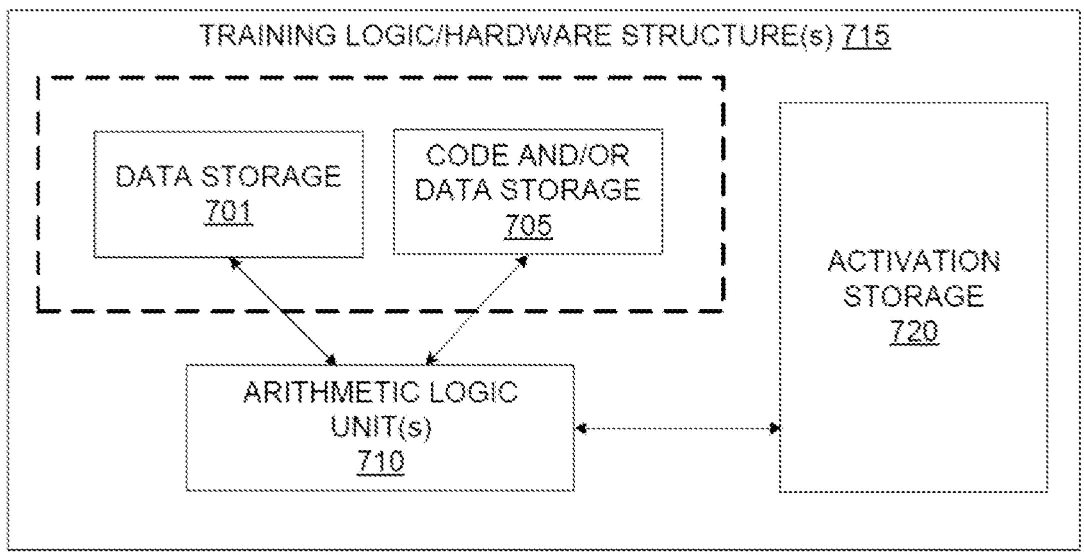
FIG. 7A illustrates inference and/or training logic 715 used to perform inferencing and/or training operations associated with one or more embodiments.

FIG. 7A illustrates inference and/or training logic 715 used to perform inferencing and/or training operations associated with one or more embodiments. Details regarding inference and/or training logic 715 are provided herein in conjunction with at least FIGS. 7A and/or 7B.

In at least one embodiment, inference and/or training logic 715 may include, without limitation, code and/or data storage 701 to store forward and/or output weight and/or input/output data, and/or other parameters to configure neurons or layers of a neural network trained and/or used for inferencing in aspects of one or more embodiments. In at least one embodiment, training logic 715 may include, or be coupled to code and/or data storage 701 to store graph code or other software to control timing and/or order, in which weight and/or other parameter information is to be loaded to configure, logic, including integer and/or floating point units (collectively, arithmetic logic units (ALUs)). In at least one embodiment, code, such as graph code, loads weight or other parameter information into processor ALUs based on an architecture of a neural network to which such code corresponds. In at least one embodiment, code and/or data storage 701 stores weight parameters and/or input/output data of each layer of a neural network trained or used in conjunction with one or more embodiments during forward propagation of input/output data and/or weight parameters during training and/or inferencing using aspects of one or more embodiments. In at least one embodiment, any portion of code and/or data storage 701 may be included with other on-chip or off-chip data storage, including a processor's L1, L2, or L3 cache or system memory.

In at least one embodiment, any portion of code and/or data storage 701 may be internal or external to one or more processors or other hardware logic devices or circuits. In at least one embodiment, code and/or code and/or data storage 701 may be cache memory, dynamic randomly addressable memory ("DRAM"), static randomly addressable memory ("SRAM"), non-volatile memory (e.g., flash memory), or other storage. In at least one embodiment, a choice of whether code and/or code and/or data storage 701 is internal or external to a processor, for example, or comprising DRAM, SRAM, flash or some other storage type may depend on available storage on-chip versus off-chip, latency requirements of training and/or inferencing functions being performed, batch size of data used in inferencing and/or training of a neural network, or some combination of these factors.

In at least one embodiment, inference and/or training logic 715 may include, without limitation, a code and/or data storage 705 to store backward and/or output weight and/or input/output data corresponding to neurons or layers of a neural network trained and/or used for inferencing in aspects of one or more embodiments. In at least one embodiment, code and/or data storage 705 stores weight parameters and/or input/output data of each layer of a neural network trained or used in conjunction with one or more embodiments during backward propagation of input/output data and/or weight parameters during training and/or inferencing using aspects of one or more embodiments. In at least one embodiment, training logic 715 may include, or be coupled to code and/or data storage 705 to store graph code or other software to control timing and/or order, in which weight and/or other parameter information is to be loaded to configure, logic, including integer and/or floating point units (collectively, arithmetic logic units (ALUs)).

In at least one embodiment, code, such as graph code, causes the loading of weight or other parameter information into processor ALUs based on an architecture of a neural network to which such code corresponds. In at least one embodiment, any portion of code and/or data storage 705 may be included with other on-chip or off-chip data storage, including a processor's L1, L2, or L3 cache or system memory. In at least one embodiment, any portion of code and/or data storage 705 may be internal or external to one or more processors or other hardware logic devices or circuits. In at least one embodiment, code and/or data storage 705 may be cache memory, DRAM, SRAM, non-volatile memory (e.g., flash memory), or other storage. In at least one embodiment, a choice of whether code and/or data storage 705 is internal or external to a processor, for example, or comprising DRAM, SRAM, flash memory or some other storage type may depend on available storage on-chip versus off-chip, latency requirements of training and/or inferencing functions being performed, batch size of data used in inferencing and/or training of a neural network, or some combination of these factors.

In at least one embodiment, code and/or data storage 701 and code and/or data storage 705 may be separate storage structures. In at least one embodiment, code and/or data storage 701 and code and/or data storage 705 may be a combined storage structure. In at least one embodiment, code and/or data storage 701 and code and/or data storage 705 may be partially combined and partially separate. In at least one embodiment, any portion of code and/or data storage 701 and code and/or data storage 705 may be included with other on-chip or off-chip data storage, including a processor's L1, L2, or L3 cache or system memory.

In at least one embodiment, inference and/or training logic 715 may include, without limitation, one or more arithmetic logic unit(s) ("ALU(s)") 710, including integer and/or floating point units, to perform logical and/or mathematical operations based, at least in part on, or indicated by, training and/or inference code (e.g., graph code), a result of which may produce activations (e.g., output values from layers or neurons within a neural network) stored in an activation storage 720 that are functions of input/output and/or weight parameter data stored in code and/or data storage 701 and/or code and/or data storage 705. In at least one embodiment, activations stored in activation storage 720 are generated according to linear algebraic and or matrix-based mathematics performed by ALU(s) 710 in response to performing instructions or other code, wherein weight values stored in code and/or data storage 705 and/or data storage 701 are used as operands along with other values, such as bias values, gradient information, momentum values, or other parameters or hyperparameters, any or all of which may be stored in code and/or data storage 705 or code and/or data storage 701 or another storage on or off-chip.

In at least one embodiment, ALU(s) 710 are included within one or more processors or other hardware logic devices or circuits, whereas in another embodiment, ALU(s) 710 may be external to a processor or other hardware logic device or circuit that uses them (e.g., a coprocessor). In at least one embodiment, ALUs 710 may be included within a processor's execution units or otherwise within a bank of ALUs accessible by a processor's execution units either within same processor or distributed between different processors of different types (e.g., central processing units, graphics processing units, fixed function units, etc.). In at least one embodiment, code and/or data storage 701, code and/or data storage 705, and activation storage 720 may share a processor or other hardware logic device or circuit, whereas in another embodiment, they may be in different processors or other hardware logic devices or circuits, or some combination of same and different processors or other hardware logic devices or circuits. In at least one embodiment, any portion of activation storage 720 may be included with other on-chip or off-chip data storage, including a processor's L1, L2, or L3 cache or system memory. Furthermore, inferencing and/or training code may be stored with other code accessible to a processor or other hardware logic or circuit and fetched and/or processed using a processor's fetch, decode, scheduling, execution, retirement and/or other logical circuits.

In at least one embodiment, activation storage 720 may be cache memory, DRAM, SRAM, non-volatile memory (e.g., flash memory), or other storage. In at least one embodiment, activation storage 720 may be completely or partially within or external to one or more processors or other logical circuits. In at least one embodiment, a choice of whether activation storage 720 is internal or external to a processor, for example, or comprising DRAM, SRAM, flash memory or some other storage type may depend on available storage on-chip versus off-chip, latency requirements of training and/or inferencing functions being performed, batch size of data used in inferencing and/or training of a neural network, or some combination of these factors.

In at least one embodiment, inference and/or training logic 715 illustrated in FIG. 7A may be used in conjunction with an application-specific integrated circuit ("ASIC"), such as a TensorFlow® Processing Unit from Google, an inference processing unit (IPU) from Graphcore™, or a Nervana® (e.g., "Lake Crest") processor from Intel Corp. In at least one embodiment, inference and/or training logic 715 illustrated in FIG. 7A may be used in conjunction with central processing unit ("CPU") hardware, graphics processing unit ("GPU") hardware or other hardware, such as field programmable gate arrays ("FPGAs").

Figure 7B:
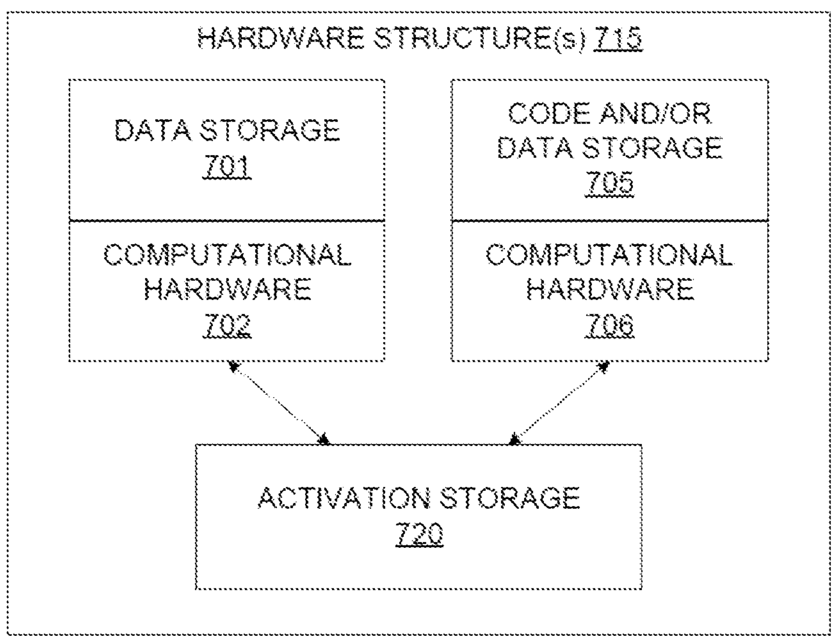
FIG. 7B illustrates inference and/or training logic 715, according to at least one embodiment.

FIG. 7B illustrates inference and/or training logic 715, according to at least one embodiment. In at least one embodiment, inference and/or training logic 715 may include, without limitation, hardware logic in which computational resources are dedicated or otherwise exclusively used in conjunction with weight values or other information corresponding to one or more layers of neurons within a neural network. In at least one embodiment, inference and/or training logic 715 illustrated in FIG. 7B may be used in conjunction with an application-specific integrated circuit (ASIC), such as TensorFlow® Processing Unit from Google, an inference processing unit (IPU) from Graphcore™, or a Nervana® (e.g., "Lake Crest") processor from Intel Corp. In at least one embodiment, inference and/or training logic 715 illustrated in FIG. 7B may be used in conjunction with central processing unit (CPU) hardware, graphics processing unit (GPU) hardware or other hardware, such as field programmable gate arrays (FPGAs). In at least one embodiment, inference and/or training logic 715 includes, without limitation, code and/or data storage 701 and code and/or data storage 705, which may be used to store code (e.g., graph code), weight values and/or other information, including bias values, gradient information, momentum values, and/or other parameter or hyperparameter information. In at least one embodiment illustrated in FIG. 7B, each of code and/or data storage 701 and code and/or data storage 705 is associated with a dedicated computational resource, such as computational hardware 702 and computational hardware 706, respectively. In at least one embodiment, each of computational hardware 702 and computational hardware 706 comprises one or more ALUs that perform mathematical functions, such as linear algebraic functions, only on information stored in code and/or data storage 701 and code and/or data storage 705, respectively, result of which is stored in activation storage 720.

In at least one embodiment, each of code and/or data storage 701 and 705 and corresponding computational hardware 702 and 706, respectively, correspond to different layers of a neural network, such that resulting activation from one storage/computational pair 701/702 of code and/or data storage 701 and computational hardware 702 is provided as an input to a next storage/computational pair 705/706 of code and/or data storage 705 and computational hardware 706, in order to mirror a conceptual organization of a neural network. In at least one embodiment, each of storage/computational pairs 701/702 and 705/706 may correspond to more than one neural network layer. In at least one embodiment, additional storage/computation pairs (not shown) subsequent to or in parallel with storage/computation pairs 701/702 and 705/706 may be included in inference and/or training logic 715.

Neural Network Training and Deployment

Figure 8:
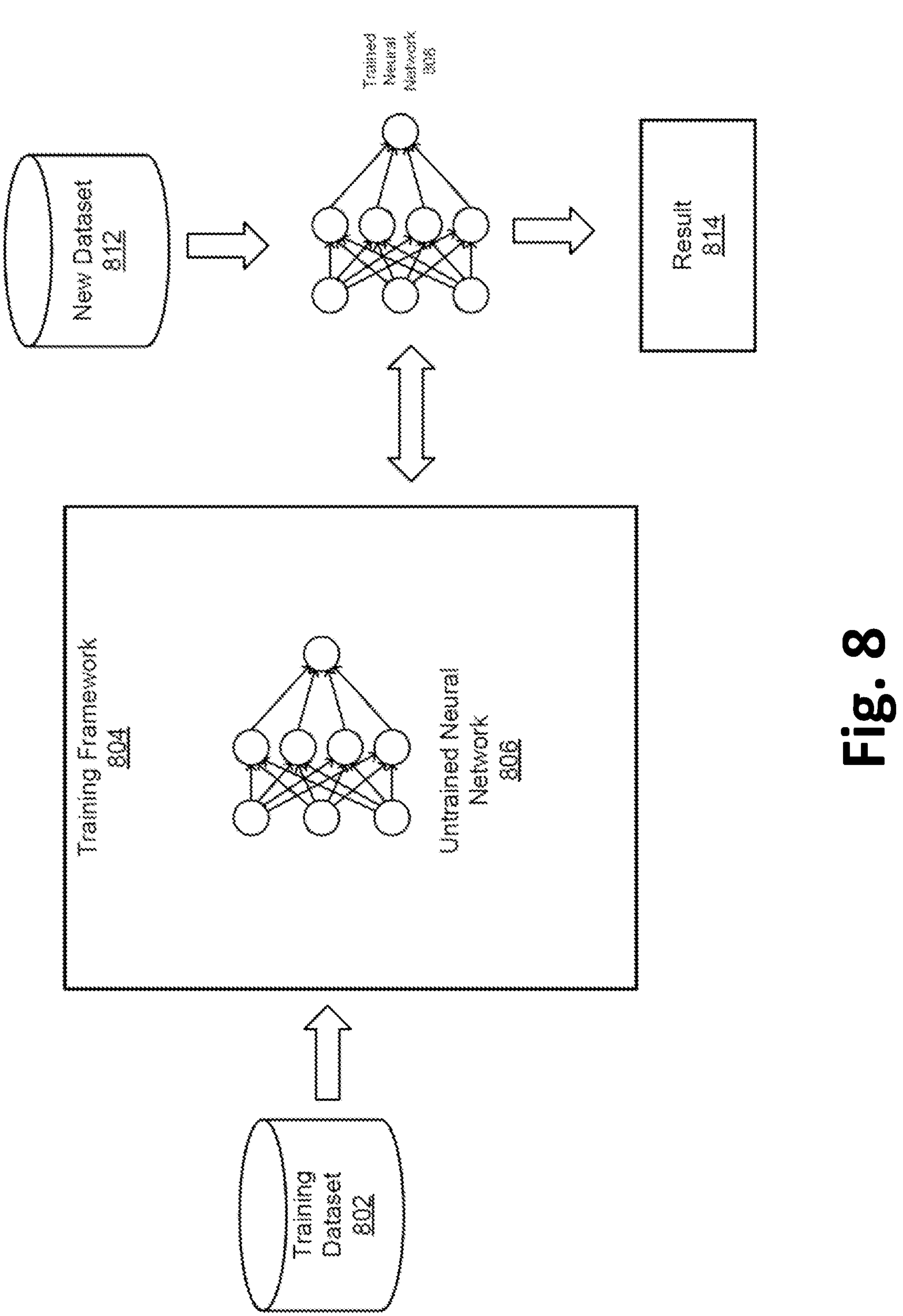
FIG. 8 illustrates training and deployment of a deep neural network, according to at least one embodiment.

FIG. 8 illustrates training and deployment of a deep neural network, according to at least one embodiment. In at least one embodiment, untrained neural network 806 is trained using a training dataset 802. In at least one embodiment, training framework 804 is a PyTorch framework, whereas in other embodiments, training framework 804 is a TensorFlow, Boost, Caffe, Microsoft Cognitive Toolkit/CNTK, MXNet, Chainer, Keras, Deeplearning4j, or other training framework. In at least one embodiment, training framework 804 trains an untrained neural network 806 and enables it to be trained using processing resources described herein to generate a trained neural network 808. In at least one embodiment, weights may be chosen randomly or by pre-training using a deep belief network. In at least one embodiment, training may be performed in either a supervised, partially supervised, or unsupervised manner.

In at least one embodiment, untrained neural network 806 is trained using supervised learning, wherein training dataset 802 includes an input paired with a desired output for an input, or where training dataset 802 includes input having a known output and an output of neural network 806 is manually graded. In at least one embodiment, untrained neural network 806 is trained in a supervised manner and processes inputs from training dataset 802 and compares resulting outputs against a set of expected or desired outputs. In at least one embodiment, errors are then propagated back through untrained neural network 806. In at least one embodiment, training framework 804 adjusts weights that control untrained neural network 806. In at least one embodiment, training framework 804 includes tools to monitor how well untrained neural network 806 is converging towards a model, such as trained neural network 808, suitable to generating correct answers, such as in result 814, based on input data such as a new dataset 812. In at least one embodiment, training framework 804 trains untrained neural network 806 repeatedly while adjust weights to refine an output of untrained neural network 806 using a loss function and adjustment algorithm, such as stochastic gradient descent. In at least one embodiment, training framework 804 trains untrained neural network 806 until untrained neural network 806 achieves a desired accuracy. In at least one embodiment, trained neural network 808 can then be deployed to implement any number of machine learning operations.

In at least one embodiment, untrained neural network 806 is trained using unsupervised learning, wherein untrained neural network 806 attempts to train itself using unlabeled data. In at least one embodiment, unsupervised learning training dataset 802 will include input data without any associated output data or "ground truth" data. In at least one embodiment, untrained neural network 806 can learn groupings within training dataset 802 and can determine how individual inputs are related to untrained dataset 802. In at least one embodiment, unsupervised training can be used to generate a self-organizing map in trained neural network 808 capable of performing operations useful in reducing dimensionality of new dataset 812. In at least one embodiment, unsupervised training can also be used to perform anomaly detection, which allows identification of data points in new dataset 812 that deviate from normal patterns of new dataset 812.

In at least one embodiment, semi-supervised learning may be used, which is a technique in which in training dataset 802 includes a mix of labeled and unlabeled data. In at least one embodiment, training framework 804 may be used to perform incremental learning, such as through transferred learning techniques. In at least one embodiment, incremental learning enables trained neural network 808 to adapt to new dataset 812 without forgetting knowledge instilled within trained neural network 808 during initial training.

In at least one embodiment, training framework 804 is a framework processed in connection with a software development toolkit such as an OpenVINO (Open Visual Inference and Neural network Optimization) toolkit. In at least one embodiment, an OpenVINO toolkit is a toolkit such as those developed by Intel Corporation of Santa Clara, CA.

In at least one embodiment, OpenVINO is a toolkit for facilitating development of applications, specifically neural network applications, for various tasks and operations, such as human vision emulation, speech recognition, natural language processing, recommendation systems, and/or variations thereof. In at least one embodiment, OpenVINO supports neural networks such as convolutional neural networks (CNNs), recurrent and/or attention-based nueral networks, and/or various other neural network models. In at least one embodiment, OpenVINO supports various software libraries such as OpenCV, OpenCL, and/or variations thereof.

In at least one embodiment, OpenVINO supports neural network models for various tasks and operations, such as classification, segmentation, object detection, face recognition, speech recognition, pose estimation (e.g., humans and/or objects), monocular depth estimation, image inpainting, style transfer, action recognition, colorization, and/or variations thereof.

In at least one embodiment, OpenVINO comprises one or more software tools and/or modules for model optimization, also referred to as a model optimizer. In at least one embodiment, a model optimizer is a command line tool that facilitates transitions between training and deployment of neural network models. In at least one embodiment, a model optimizer optimizes neural network models for execution on various devices and/or processing units, such as a GPU, CPU, PPU, GPGPU, and/or variations thereof. In at least one embodiment, a model optimizer generates an internal representation of a model, and optimizes said model to generate an intermediate representation. In at least one embodiment, a model optimizer reduces a number of layers of a model. In at least one embodiment, a model optimizer removes layers of a model that are utilized for training. In at least one embodiment, a model optimizer performs various neural network operations, such as modifying inputs to a model (e.g., resizing inputs to a model), modifying a size of inputs of a model (e.g., modifying a batch size of a model), modifying a model structure (e.g., modifying layers of a model), normalization, standardization, quantization (e.g., converting weights of a model from a first representation, such as floating point, to a second representation, such as integer), and/or variations thereof.

In at least one embodiment, OpenVINO comprises one or more software libraries for inferencing, also referred to as an inference engine. In at least one embodiment, an inference engine is a C++ library, or any suitable programming language library. In at least one embodiment, an inference engine is utilized to infer input data. In at least one embodiment, an inference engine implements various classes to infer input data and generate one or more results. In at least one embodiment, an inference engine implements one or more API functions to process an intermediate representation, set input and/or output formats, and/or execute a model on one or more devices.

In at least one embodiment, OpenVINO provides various abilities for heterogeneous execution of one or more neural network models. In at least one embodiment, heterogeneous execution, or heterogeneous computing, refers to one or more computing processes and/or systems that utilize one or more types of processors and/or cores. In at least one embodiment, OpenVINO provides various software functions to execute a program on one or more devices. In at least one embodiment, OpenVINO provides various software functions to execute a program and/or portions of a program on different devices. In at least one embodiment, OpenVINO provides various software functions to, for example, run a first portion of code on a CPU and a second portion of code on a GPU and/or FPGA. In at least one embodiment, OpenVINO provides various software functions to execute one or more layers of a neural network on one or more devices (e.g., a first set of layers on a first device, such as a GPU, and a second set of layers on a second device, such as a CPU).

In at least one embodiment, OpenVINO includes various functionality similar to functionalities associated with a CUDA programming model, such as various neural network model operations associated with frameworks such as TensorFlow, PyTorch, and/or variations thereof. In at least one embodiment, one or more CUDA programming model operations are performed using OpenVINO. In at least one embodiment, various systems, methods, and/or techniques described herein are implemented using OpenVINO.

Other variations are within spirit of present disclosure. Thus, while disclosed techniques are susceptible to various modifications and alternative constructions, certain illustrated embodiments thereof are shown in drawings and have been described herein in detail. It should be understood, however, that there is no intention to limit disclosure to specific form or forms disclosed, but on contrary, intention is to cover all modifications, alternative constructions, and equivalents falling within spirit and scope of disclosure, as defined in appended claims.

Use of terms "a" and "an" and "the" and similar referents in context of describing disclosed embodiments (especially in context of following claims) are to be construed to cover both singular and plural, unless otherwise indicated herein or clearly contradicted by context, and not as a definition of a term. Terms "comprising," "having," "including," and "containing" are to be construed as open-ended terms (meaning "including, but not limited to,") unless otherwise noted. "Connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within range, unless otherwise indicated herein and each separate value is incorporated into specification as if it were individually recited herein. In at least one embodiment, use of term "set" (e.g., "a set of items") or "subset" unless otherwise noted or contradicted by context, is to be construed as a nonempty collection comprising one or more members. Further, unless otherwise noted or contradicted by context, term "subset" of a corresponding set does not necessarily denote a proper subset of corresponding set, but subset and corresponding set may be equal.

Conjunctive language, such as phrases of form "at least one of A, B, and C," or "at least one of A, B and C," unless specifically stated otherwise or otherwise clearly contradicted by context, is otherwise understood with context as used in general to present that an item, term, etc., may be either A or B or C, or any nonempty subset of set of A and B and C. For instance, in illustrative example of a set having three members, conjunctive phrases "at least one of A, B, and C" and "at least one of A, B and C" refer to any of following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present. In addition, unless otherwise noted or contradicted by context, term "plurality" indicates a state of being plural (e.g., "a plurality of items" indicates multiple items). In at least one embodiment, number of items in a plurality is at least two, but can be more when so indicated either explicitly or by context. Further, unless stated otherwise or otherwise clear from context, phrase "based on" means "based at least in part on" and not "based solely on."

Operations of processes described herein can be performed in any suitable order unless otherwise indicated herein or otherwise clearly contradicted by context. In at least one embodiment, a process such as those processes described herein (or variations and/or combinations thereof) is performed under control of one or more computer systems configured with executable instructions and is implemented as code (e.g., executable instructions, one or more computer programs or one or more applications) executing collectively on one or more processors, by hardware or combinations thereof. In at least one embodiment, code is stored on a computer-readable storage medium, for example, in form of a computer program comprising a plurality of instructions executable by one or more processors. In at least one embodiment, a computer-readable storage medium is a non-transitory computer-readable storage medium that excludes transitory signals (e.g., a propagating transient electric or electromagnetic transmission) but includes non-transitory data storage circuitry (e.g., buffers, cache, and queues) within transceivers of transitory signals. In at least one embodiment, code (e.g., executable code or source code) is stored on a set of one or more non-transitory computer-readable storage media having stored thereon executable instructions (or other memory to store executable instructions) that, when executed (i.e., as a result of being executed) by one or more processors of a computer system, cause computer system to perform operations described herein. In at least one embodiment, set of non-transitory computer-readable storage media comprises multiple non-transitory computer-readable storage media and one or more of individual non-transitory storage media of multiple non-transitory computer-readable storage media lack all of code while multiple non-transitory computer-readable storage media collectively store all of code. In at least one embodiment, executable instructions are executed such that different instructions are executed by different processors—for example, a non-transitory computer-readable storage medium store instructions and a main central processing unit ("CPU") executes some of instructions while a graphics processing unit ("GPU") executes other instructions. In at least one embodiment, different components of a computer system have separate processors and different processors execute different subsets of instructions.

In at least one embodiment, an arithmetic logic unit is a set of combinational logic circuitry that takes one or more inputs to produce a result. In at least one embodiment, an arithmetic logic unit is used by a processor to implement mathematical operation such as addition, subtraction, or multiplication. In at least one embodiment, an arithmetic logic unit is used to implement logical operations such as logical AND/OR or XOR. In at least one embodiment, an arithmetic logic unit is stateless, and made from physical switching components such as semiconductor transistors arranged to form logical gates. In at least one embodiment, an arithmetic logic unit may operate internally as a stateful logic circuit with an associated clock. In at least one embodiment, an arithmetic logic unit may be constructed as an asynchronous logic circuit with an internal state not maintained in an associated register set. In at least one embodiment, an arithmetic logic unit is used by a processor to combine operands stored in one or more registers of the processor and produce an output that can be stored by the processor in another register or a memory location.

In at least one embodiment, as a result of processing an instruction retrieved by the processor, the processor presents one or more inputs or operands to an arithmetic logic unit, causing the arithmetic logic unit to produce a result based at least in part on an instruction code provided to inputs of the arithmetic logic unit. In at least one embodiment, the instruction codes provided by the processor to the ALU are based at least in part on the instruction executed by the processor. In at least one embodiment combinational logic in the ALU processes the inputs and produces an output which is placed on a bus within the processor. In at least one embodiment, the processor selects a destination register, memory location, output device, or output storage location on the output bus so that clocking the processor causes the results produced by the ALU to be sent to the desired location.

In the scope of this application, the term arithmetic logic unit, or ALU, is used to refer to any computational logic circuit that processes operands to produce a result. For example, in the present document, the term ALU can refer to a floating point unit, a DSP, a tensor core, a shader core, a coprocessor, or a CPU.

Accordingly, in at least one embodiment, computer systems are configured to implement one or more services that singly or collectively perform operations of processes described herein and such computer systems are configured with applicable hardware and/or software that enable performance of operations. Further, a computer system that implements at least one embodiment of present disclosure is a single device and, in another embodiment, is a distributed computer system comprising multiple devices that operate differently such that distributed computer system performs operations described herein and such that a single device does not perform all operations.

Use of any and all examples, or exemplary language (e.g., "such as") provided herein, is intended merely to better illuminate embodiments of disclosure and does not pose a limitation on scope of disclosure unless otherwise claimed. No language in specification should be construed as indicating any non-claimed element as essential to practice of disclosure.

All references, including publications, patent applications, and patents, cited herein are hereby incorporated by reference to same extent as if each reference were individually and specifically indicated to be incorporated by reference and were set forth in its entirety herein.

In description and claims, terms "coupled" and "connected," along with their derivatives, may be used. It should be understood that these terms may be not intended as synonyms for each other. Rather, in particular examples, "connected" or "coupled" may be used to indicate that two or more elements are in direct or indirect physical or electrical contact with each other. "Coupled" may also mean that two or more elements are not in direct contact with each other, but yet still co-operate or interact with each other.

Unless specifically stated otherwise, it may be appreciated that throughout specification terms such as "processing," "computing," "calculating," "determining," or like, refer to action and/or processes of a computer or computing system, or similar electronic computing device, that manipulate and/or transform data represented as physical, such as electronic, quantities within computing system's registers and/or memories into other data similarly represented as physical quantities within computing system's memories, registers or other such information storage, transmission or display devices.

In a similar manner, term "processor" may refer to any device or portion of a device that processes electronic data from registers and/or memory and transform that electronic data into other electronic data that may be stored in registers and/or memory. As non-limiting examples, "processor" may be a CPU or a GPU. A "computing platform" may comprise one or more processors. As used herein, "software" processes may include, for example, software and/or hardware entities that perform work over time, such as tasks, threads, and intelligent agents. Also, each process may refer to multiple processes, for carrying out instructions in sequence or in parallel, continuously or intermittently. In at least one embodiment, terms “system” and “method” are used herein interchangeably insofar as system may embody one or more methods and methods may be considered a system.

In present document, references may be made to obtaining, acquiring, receiving, or inputting analog or digital data into a subsystem, computer system, or computer-implemented machine. In at least one embodiment, process of obtaining, acquiring, receiving, or inputting analog and digital data can be accomplished in a variety of ways such as by receiving data as a parameter of a function call or a call to an application programming interface. In at least one embodiment, processes of obtaining, acquiring, receiving, or inputting analog or digital data can be accomplished by transferring data via a serial or parallel interface. In at least one embodiment, processes of obtaining, acquiring, receiving, or inputting analog or digital data can be accomplished by transferring data via a computer network from providing entity to acquiring entity. In at least one embodiment, references may also be made to providing, outputting, transmitting, sending, or presenting analog or digital data. In various examples, processes of providing, outputting, transmitting, sending, or presenting analog or digital data can be accomplished by transferring data as an input or output parameter of a function call, a parameter of an application programming interface or interprocess communication mechanism.

Although descriptions herein set forth example implementations of described techniques, other architectures may be used to implement described functionality, and are intended to be within scope of this disclosure. Furthermore, although specific distributions of responsibilities may be defined above for purposes of description, various functions and responsibilities might be distributed and divided in different ways, depending on circumstances.

1. In some embodiments, a method comprises receiving a first frame of acoustic input and a prior textual token associated with a prior frame of the acoustic input, the prior textual token representing one or more spoken words included in the acoustic input, generating a multi-dimensional embedding associated with the prior textual token, each dimension of the embedding representing a different characteristic of the prior textual token, and at least one dimension of the embedding representing pronunciation information associated with the prior textual token, and generating a textual token associated with the first frame based at least on an encoded representation of the first frame and the multi-dimensional embedding associated with the prior textual token.

2. The method of clause 1, further comprising generating the encoded representation of the first frame based at least on one or more speech characteristics included in the first frame, at least one speech characteristic comprising a phoneme included in the speech.

3. The method of clauses 1 or 2, further comprising performing one or more preprocessing operations on the first frame prior to generating the encoded representation.

4. The method of any of clauses 1-3, wherein the generating the multi-dimensional embedding comprises extracting one or more phonetic features from the prior textual token, transforming the one or more phonetic features into a structured representation, and mapping the structured representation into a numerical vector space to generate the multi-dimensional embedding.

5. The method of any of clauses 1-4, wherein the one or more phonetic features comprise one or more sounds that are represented in the textual token.

6. The method of any of clauses 1-5, wherein the pronunciation information comprises at least one of a word identity of the prior textual token, a Romanized pronunciation of the prior textual token, a tonal characteristic of the prior textual token, an initial consonant sound of the of the prior textual token, or a suffix of a pronunciation of the prior textual token.

7. The method of any of clauses 1-6, wherein the generating the textual token comprises combining the encoded representation with the multi-dimensional embedding to generate a set of possible next textual tokens.

8. The method of any of clauses 1-7, wherein the generating the textual token further comprises generating a set of probabilities associated with the set of possible next textual tokens, and selecting the textual token based at least on the set of probabilities.

9. In some embodiments, one or more processors comprising processing circuitry to perform operations comprising receiving a first frame of acoustic input and a prior textual token associated with a prior frame of the acoustic input, the prior textual token representing one or more spoken word included in the acoustic input, generating a multi-dimensional embedding associated with the prior textual token, individual dimensions of the embedding representing a different characteristic of the prior textual token, and at least one dimension of the embedding representing pronunciation information associated with the prior textual token, and generating a textual token associated with the first frame based at least on an encoded representation of the first frame and the multi-dimensional embedding associated with the prior textual token.

10. The one or more processors of clause 9, wherein the operations further comprise generating the encoded representation of the first frame based at least on one or more speech characteristics included in the first frame, at least one speech characteristic comprising a phoneme included in the speech.

11. The one or more processors of clauses 9 or 10, wherein the operations further comprise performing one or more preprocessing operations on the first frame prior to generate the encoded representation.

12. The one or more processors of any of clauses 9-11, wherein the generating the multi-dimensional embedding comprises extracting one or more phonetic features from the prior textual token, transforming the one or more phonetic features into a structured representation, and mapping the structured representation into a numerical vector space to generate the multi-dimensional embedding.

13. The one or more processors of any of clauses 9-12, wherein the one or more phonetic features comprise one or more sounds that are represented in the textual token.

14. The one or more processors of any of clauses 9-13, wherein the pronunciation information comprises at least one of a word identity of the prior textual token, a Romanized pronunciation of the prior textual token, a tonal characteristic of the prior textual token, an initial consonant sound of the of the prior textual token, or a suffix of a pronunciation of the prior textual token.

15. The one or more processors of any of clauses 9-14, wherein the generating the textual token comprises combining the encoded representation with the multi-dimensional embedding to generate a set of possible next textual tokens.

16. The one or more processors of any of clauses 9-15, wherein the generating the textual token further comprises generating a set of probabilities associated with the set of possible next textual tokens, and selecting the textual token based at least on the set of probabilities.

17. The one or more processors of any of clauses 9-16, wherein the one or more processors are comprised in at least one of a system for performing simulation operations, a system for performing digital twin operations, a system for performing collaborative content creation for 3D assets, a system for performing one or more deep learning operations, a system implemented using an edge device, a system for generating or presenting at least one of virtual reality content, augmented reality content, or mixed reality content, a system implemented using a robot, a system for performing one or more conversational AI operations, a system implemented using one or more large language models (LLMs), a system for generating synthetic data, a system for performing one or more generative AI operations, a system incorporating one or more virtual machines (VMs), a system implemented at least partially in a data center, or a system implemented at least partially using cloud computing resources.

18. In some embodiments, a system comprises one or more processors to generate a textual token that represents speech in an acoustic input based at least on an encoded representation of the acoustic input and a multi-dimensional embedding associated with a prior textual token, wherein individual dimensions of the embedding represents a different characteristic of the prior textual token, and at least one dimension of the embedding represents pronunciation information associated with the prior textual token.

19. The system of clause 18, wherein the multi-dimensional embedding is generated, at least, by extracting one or more phonetic features from the prior textual token, transforming the one or more phonetic features into a structured representation, and mapping the structured representation into a numerical vector space to generate the multi-dimensional embedding.

20. The system of clauses 18 or 19, wherein the system is comprised in at least one of a system for performing simulation operations, a system for performing digital twin operations, a system for performing collaborative content creation for 3D assets, a system for performing one or more deep learning operations, a system implemented using an edge device, a system for generating or presenting at least one of virtual reality content, augmented reality content, or mixed reality content, a system implemented using a robot, a system for performing one or more conversational AI operations, a system implemented using one or more large language models (LLMs), a system for generating synthetic data, a system for performing one or more generative AI operations, a system incorporating one or more virtual machines (VMs), a system implemented at least partially in a data center, or a system implemented at least partially using cloud computing resources.

Furthermore, although subject matter has been described in language specific to structural features and/or methodological acts, it is to be understood that subject matter claimed in appended claims is not necessarily limited to specific features or acts described. Rather, specific features and acts are disclosed as exemplary forms of implementing the claims.

What is claimed is:

1. A method comprising:

receiving a first frame of acoustic input and a prior textual token associated with a prior frame of the acoustic input, the prior textual token representing one or more spoken words included in the acoustic input;

generating a multi-dimensional embedding associated with the prior textual token, each dimension of the embedding representing a different characteristic of the prior textual token, and at least one dimension of the embedding representing pronunciation information associated with the prior textual token;

generating a textual token associated with the first frame based at least on an encoded representation of the first frame and the multi-dimensional embedding associated with the prior textual token; and outputting the textual token associated with the first frame as a token subsequent to the prior textual token, wherein a combination of the textual token and the prior textual token comprises a textual representation of the acoustic input up to the first frame of the acoustic input.

2. The method of claim 1, further comprising generating the encoded representation of the first frame based at least on one or more speech characteristics included in the first frame, at least one speech characteristic comprising a phoneme included in the speech.

3. The method of claim 2, further comprising performing one or more preprocessing operations on the first frame prior to generating the encoded representation.

4. The method of claim 1, wherein the generating the multi-dimensional embedding comprises:

extracting one or more phonetic features from the prior textual token;

transforming the one or more phonetic features into a structured representation; and mapping the structured representation into a numerical vector space to generate the multi-dimensional embedding.

5. The method of claim 4, wherein the one or more phonetic features comprise one or more sounds that are represented in the textual token.

6. The method of claim 1, wherein the pronunciation information comprises at least one of a word identity of the prior textual token, a Romanized pronunciation of the prior textual token, a tonal characteristic of the prior textual token, an initial consonant sound of the of the prior textual token, or a suffix of a pronunciation of the prior textual token.

7. The method of claim 1, wherein the generating the textual token comprises combining the encoded representation with the multi-dimensional embedding to generate a set of possible next textual tokens.

8. The method of claim 1, wherein the generating the textual token further comprises generating a set of probabilities associated with the set of possible next textual tokens, and selecting the textual token based at least on the set of probabilities.

9. One or more processors comprising:

processing circuitry to perform operations comprising:

receiving a first frame of acoustic input and a prior textual token associated with a prior frame of the acoustic input, the prior textual token representing one or more spoken words included in the acoustic input;

generating a multi-dimensional embedding associated with the prior textual token, individual dimensions of the embedding representing a different characteristic of the prior textual token, and at least one dimension of the embedding representing pronunciation information associated with the prior textual token;

generating a textual token associated with the first frame based at least on an encoded representation of the first frame and the multi-dimensional embedding associated with the prior textual token; and outputting the textual token associated with the first frame as a token subsequent to the prior textual token, wherein a combination of the textual token and the prior textual token comprises a textual representation of the acoustic input up to the first frame of the acoustic input.

10. The one or more processors of claim 9, wherein the operations further comprise generating the encoded representation of the first frame based at least on one or more speech characteristics included in the first frame, at least one speech characteristic comprising a phoneme included in the speech.

11. The one or more processors of claim 10, wherein the operations further comprise performing one or more preprocessing operations on the first frame prior to generate the encoded representation.

12. The one or more processors of claim 9, wherein the generating the multi-dimensional embedding comprises:

extracting one or more phonetic features from the prior textual token;

transforming the one or more phonetic features into a structured representation; and mapping the structured representation into a numerical vector space to generate the multi-dimensional embedding.

13. The one or more processors of claim 12, wherein the one or more phonetic features comprise one or more sounds that are represented in the textual token.

14. The one or more processors of claim 9, wherein the pronunciation information comprises at least one of a word identity of the prior textual token, a Romanized pronunciation of the prior textual token, a tonal characteristic of the prior textual token, an initial consonant sound of the of the prior textual token, or a suffix of a pronunciation of the prior textual token.

15. The one or more processors of claim 9, wherein the generating the textual token comprises combining the encoded representation with the multi-dimensional embedding to generate a set of possible next textual tokens.

16. The one or more processors of claim 9, wherein the generating the textual token further comprises generating a set of probabilities associated with the set of possible next textual tokens, and selecting the textual token based at least on the set of probabilities.

17. The one or more processors of claim 11, wherein the one or more processors are comprised in at least one of:

a system for performing simulation operations;

a system for performing digital twin operations;

a system for performing collaborative content creation for 3D assets;

a system for performing one or more deep learning operations;

a system implemented using an edge device;

a system for generating or presenting at least one of virtual reality content, augmented reality content, or mixed reality content;

a system implemented using a robot;

a system for performing one or more conversational AI operations;

a system implemented using one or more large language models (LLMs);

a system for generating synthetic data;

a system for performing one or more generative AI operations;

a system incorporating one or more virtual machines (VMs);

a system implemented at least partially in a data center; or a system implemented at least partially using cloud computing resources.

18. A system comprising:

one or more processors to generate a textual token that represents speech in an acoustic input based at least on an encoded representation of the acoustic input and a multi-dimensional embedding associated with a prior textual token, wherein individual dimensions of the embedding represents a different characteristic of the prior textual token, and at least one dimension of the embedding represents pronunciation information associated with the prior textual token, the generated textual token being output as a token subsequent to the prior textual token, a combination of the textual token and the prior textual token comprising a textual representation of the acoustic input up to a current frame of the acoustic input.

19. The system of claim 18, wherein the multi-dimensional embedding is generated, at least, by:

extracting one or more phonetic features from the prior textual token;

transforming the one or more phonetic features into a structured representation;

and mapping the structured representation into a numerical vector space to generate the multi-dimensional embedding.

20. The system of claim 18, wherein the system is comprised in at least one of:

a system for performing simulation operations;

a system for performing digital twin operations;

a system for performing collaborative content creation for 3D assets;

a system for performing one or more deep learning operations;

a system implemented using an edge device;

a system for generating or presenting at least one of virtual reality content, augmented reality content, or mixed reality content;

a system implemented using a robot;

a system for performing one or more conversational AI operations;

a system implemented using one or more large language models (LLMs);

a system for generating synthetic data;

a system for performing one or more generative AI operations;

a system incorporating one or more virtual machines (VMs);

a system implemented at least partially in a data center; or a system implemented at least partially using cloud computing resources.

* * * * *